(12) United States Patent
Schmidt et al.

(10) Patent No.: US 9,700,879 B2
(45) Date of Patent: Jul. 11, 2017

(54) MOLECULAR SIEVES WITH A LINDE TYPE A TOPOLOGY AND RELATED METHODS AND SYSTEMS

(71) Applicant: CALIFORNIA INSTITUTE OF TECHNOLOGY, Pasadena, CA (US)

(72) Inventors: Joel Schmidt, Pasadena, CA (US); Mark E Davis, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 503 days.

(21) Appl. No.: 14/318,470

(22) Filed: Jun. 27, 2014

(65) Prior Publication Data

US 2015/0004094 A1   Jan. 1, 2015

Related U.S. Application Data

(60) Provisional application No. 61/840,296, filed on Jun. 27, 2013.

(51) Int. Cl.
*C01B 39/14* (2006.01)
*B01J 29/70* (2006.01)
(Continued)

(52) U.S. Cl.
CPC ............ *B01J 29/85* (2013.01); *B01J 29/035* (2013.01); *B01J 29/041* (2013.01); *B01J 29/047* (2013.01); *B01J 29/83* (2013.01); *B01J 29/84* (2013.01); *B01J 29/86* (2013.01); *B01J 29/87* (2013.01); *B01J 29/88* (2013.01); *C01B 39/026* (2013.01); *C01B 39/06* (2013.01); *C01B 39/145* (2013.01); *C01B 39/54* (2013.01); *B01J 29/7003* (2013.01); *B01J 29/89* (2013.01); *B01J 2229/183* (2013.01)

(58) Field of Classification Search
CPC ....... C01B 39/145; C01B 39/06; C01B 39/54; B01J 29/7003; B01J 29/83; B01J 29/84; B01J 29/85; B01J 29/86; B01J 29/87; B01J 29/88; B01J 29/89
See application file for complete search history.

(56) References Cited

U.S. PATENT DOCUMENTS

| | | | |
|---|---|---|---|
| 4,440,871 | A | 4/1984 | Lok et al. |
| 4,910,006 | A | 3/1990 | Zones et al. |

(Continued)

FOREIGN PATENT DOCUMENTS

| | | |
|---|---|---|
| KR | 10-2009-0066295 | 5/2014 |
| WO | 00/21884 | 4/2000 |

OTHER PUBLICATIONS

Schmidt et al, "The synthesis of aluminophosphate and germanosilicate LTA using a triquaternary structure directing agent.", Microporous and Mesoporous Materials 200, (2014) pp. 132-139.*

(Continued)

*Primary Examiner* — David M Brunsman
(74) *Attorney, Agent, or Firm* — Baker & Hostetler LLP

(57) ABSTRACT

A method for preparing molecular sieves with a Linde Type A (LTA) topology structure, and molecular sieves obtained thereby are described wherein a structure directing agent comprising a triquaternary cation is contacted with a source of a first oxide of a first tetravalent element or a source of a first oxide of a trivalent element; and a source of an oxide of a pentavalent elements.

41 Claims, 23 Drawing Sheets

(51) Int. Cl.

| | | |
|---|---|---|
| B01J 29/85 | (2006.01) | |
| B01J 29/83 | (2006.01) | |
| B01J 29/84 | (2006.01) | |
| B01J 29/04 | (2006.01) | |
| B01J 29/87 | (2006.01) | |
| B01J 29/86 | (2006.01) | |
| B01J 29/88 | (2006.01) | |
| B01J 29/035 | (2006.01) | |
| C01B 39/06 | (2006.01) | |
| C01B 39/02 | (2006.01) | |
| C01B 39/54 | (2006.01) | |
| B01J 29/89 | (2006.01) | |

(56) References Cited

U.S. PATENT DOCUMENTS

| | | | |
|---|---|---|---|
| 5,316,753 | A | 5/1994 | Nakagawa |
| 5,380,947 | A | 1/1995 | Chen et al. |
| 6,960,327 | B2 | 11/2005 | Navrotsky et al. |
| 7,138,099 | B1 | 11/2006 | Zones et al. |
| 2005/0074397 | A1 | 4/2005 | Pinnavaia et al. |
| 2015/0004094 | A1* | 1/2015 | Schmidt .................. B01J 29/85 423/704 |

OTHER PUBLICATIONS

Boal et al, Synthesis of Germanosilicate Molecular Sieves from Mono- and Di- Quaternary Ammonium OSDA's Constructed from Benzyl Imidazolium Derivatives: Stabilization of Large Micropore Volumnes Including New Molecular Sieve CIT-13, Chem. Mater., (2016), 28, pp. 2158-2164.*

Camblor, M.; Villaescusa, L. Synthesis of all silica and high silica molecular sieves in fluoride media. *Topics in Catalysis* 9 (1999) 59-76.

Blasco, T.; Corma, A.; Diaz Cabañas, M. J.; Rey, F.; Vidal Moya, J. A.; Zicovich Wilson, C. M. Preferential Location of Ge in the Double Four Membered Ring Units of ITQ-7 Zeolite. *The Journal of Physical Chemistry B* 2002, 106, 2634-2642.

Wragg, D. S.; Morris, R. E.; Burton, A. W. Pure Silica Zeolite-type Frameworks: A Structural Analysis. *Chemistry of Materials* 2008, 20, 1561-1570.

Zwijnenburg, M. A.; Bromley, S. T.; Jansen, J. C.; Maschmeyer, T. Computational insights into the role Ge in stabilizing double-four ring containing zeolites. *Microporous and Mesoporous Materials* 2004, 73, 171-174.

Jiang, J.; Yu, J.; Corma, A. Extra-Large-Pore Zeolites: Bridging the Gap between Micro and Mesoporous Structures. *Angewandte Chemie International Edition* 2010, 49, 3120-3145.

Zicovich Wilson, C. M.; San Román, M.L.; Camblor, M.A.; Pascale, F.; Durand Niconoff, J.S. Structure, Vibrational Analysis, and Insights into Host-Guest Interactions in As Synthesized Pure Silica ITQ-12 Zeolite by Periodic B3LYP Calculations. *Journal of the American Chemical Society* 2007,129, 11512-11523.

Sierra, L.; Deroche, C.; Gies, H.; Guth, J. Synthesis of new microporous $AlPO_4$ and substituted derivatives with the LTA structure. *Microporous Materials* 1994, 3, 29-38.

Lok, B.; Cannan, T.; Messina, C. The role of organic molecules in molecular sieve synthesis. *Zeolites* 1983, 3, 282-291.

Schreyeck, L.; Stumbe, J.; Caullet, P.; Mougenel, J.; Marler, B., The diaza-polyoxa-macrocycle "Kryptofix222" as a new template for the synthesis of LTA-type $AlPO_4$ : Contemplating role of F and/or $(CH_3)_4N^+$ ions. *Microporous and Mesoporous Materials* 1998, 22, 87-106.

Fayad, E.; Bats, N.; Kirschhock, C. A.; Rebours, B.; Quoineaud, A.; Martens, J. A Rational Approach to the Ionothermal Synthesis of an $AlPO_4$ Molecular Sieve with an LTA-Type Framework. *Angewandte Chemie International Edition* 2010, 49, 4585-4588.

Richardson, J.; Pluth, J.; Smith, J.; Dytrych, W.; Bibby, D. Conformation of ethylene glycol and phase change in silica sodalite. *The Journal of Physical Chemistry* 1988, 92, 243-247.

Bibby, D.; Dale, M. Synthesis of silica-sodalite from non-aqueous systems. *Nature* 1985, 317, 157-158.

Hong, S.; Camblor, M.; Davis, M. Host Guest Interactions in Pure Silica and Aluminosilicate Sodalites Containing Ethylene Glycol as a Guest Molecule. *Journal of the American Chemical Society* 1997, 119, 761-770.

Group notation revised in periodic table, *Chem. Eng. News*, 1985, 26-27.

Corma, A. et al. "Supramolecular self-assembled molecules as organic directing agent for synthesis of zeolites" *Nature*, vol. 431, Sep. 16, 2004, 287-290.

Robeson H. et al. "Verified syntheses of zeolitic materials" second revised edition Elsevier, Amsterdam (2001).

ColloidalWorld.com—All about Colloidal Mineral Supplements. *Liquid Zeolite—The most important supplement you'll ever take!* Retrieved on Jan. 2, 2014 from: <http://www.colloidalworld.com/liquid_zeolite_html>.

PCT International Search Report mailed on Nov. 26, 2014 for PCT/US2014/044734 filed on Jun. 27, 2014 in the name of California Institute of Technology.

PCT Written Opinion mailed on Nov. 26, 2014 for PCT/US2014/044734 filed on Jun. 27, 2014 in the name of California Institute of Technology.

Beck, L.W., et al. *Alkylammonium polycations as structure-directing agents in MFI zeolite synthesis*. Microporous and Mesoporous Materials, vol. 22, pp. 107-114. 1998.

Christensen, A.N., et al. *Use of Hydrofluoric Acid as Mineralizer in Hydrothermal and Organothermal Synthesis of $Me^{2+}$-Substituted Aluminophosphates*. Acta Chemica Scandinavica, vol. 53, pp. 403-409. 1999.

Huang, A., et al. *Highly oriented, neutral and cation-free AlPO4 LTA:from a seed crystal monolayer to a molecular sieve membrane*. Chemical Communications, vol. 47, pp. 4201-4203. 2011.

Hu, Y., et al. *Thermochemical study of the relative stability of dense and microporous aluminophosphate frameworks*. Chemistry of Materials, 7, pp. 1816 1823. 1995.

Kuhl, G., et al. *A reexamination of phosphorous containing zeolites ZK-21 and ZK-22 in light of SAPO-42*. Zeolites, vol. 10, pp. 2-7. 1990.

Schreyeck, L., et al. *Synthesis of the LTA type AlPO4 in the presence of the diazapolyoxa macrocycle 'Kryptofix 222.'* Chemical Communications, pp. 1241-1242. 1997.

* cited by examiner

MOLECULAR SIEVES WITH A LINDE TYPE A TOPOLOGY AND RELATED METHODS AND SYSTEMS

CROSS REFERENCE TO RELATED APPLICATIONS

This application claims the benefit of priority of U.S. Provisional Application entitled "Preparation of Molecular Sieves with the LTA Topology Using a Triquat SDA" Ser. No. 61/840,296 filed Jun. 27, 2013, the disclosure of which is incorporated herein by reference in its entirety. This application is also related to the International Application entitled "Molecular Sieves with a Linde Type A Topology and Related methods and Systems" Serial No. PCT/US2014/044734 filed on Jun. 27, 2104, the disclosure of which is incorporated by reference in its entirety.

FIELD

The present disclosure relates to molecular sieves and related methods and structure directing agents.

BACKGROUND

Molecular sieves are a class of important materials used in the chemical industry for processes such as gas stream purification and hydrocarbon conversion processes. Molecular sieves are porous solids having interconnected pores of same or different sizes. Molecular sieves typically have a one-, two- or three-dimensional crystalline pore structure having pores of one or more molecular dimensions that selectively adsorb molecules that can enter the pores, and exclude those molecules that are too large. The pore size, pore shape, interstitial spacing or channels, composition, crystal morphology and structure are a few characteristics of molecular sieves that determine their use in various hydrocarbon adsorption and conversion processes.

SUMMARY

Provided herein are molecular sieves with a Linde Type A (LTA) topology and related methods, systems and structure directing agents. In particular as-synthesized molecular sieves with LTA topology are described prepared with a triquaternary structure directing agent and related methods and systems.

According to a first aspect, an as-synthesized molecular sieve with a Linde Type A (LTA) topology is described, the as-synthesized molecule sieve prepared by a method comprising preparing a reaction mixture comprising a first structure directing agent comprising a triquaternary cation (I)

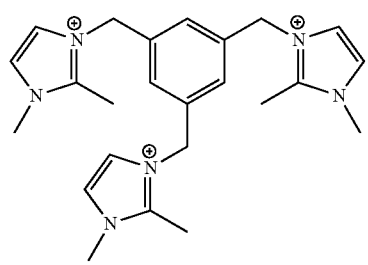

(I)

(hereinafter also referred to as Triquat), a source of a first oxide of a first tetravalent element, a source of fluoride, and optionally, a source of a second oxide of a second tetravalent element, and maintaining the reaction mixture for a time and under conditions to form crystals of the molecular sieve with LTA topology.

According to a second aspect, an as-synthesized molecular sieve with a Linde Type A (LTA) topology prepared by a method, the method comprising preparing a reaction mixture comprising a first structure directing agent comprising a triquaternary cation (I) a source of a first oxide selected from a group consisting of oxides of trivalent elements, a source of a second oxide selected from a group consisting of oxides of pentavalent elements, and optionally a source of a third oxide selected from a group consisting of oxides of metals having a +2 oxidation state and oxides of tetravalent elements, and maintaining the reaction mixture for a time and under conditions to form crystals of the molecular sieve with LTA topology.

According to a third aspect, a method for preparing an as-synthesized molecular sieve with a Linde Type A (LTA) topology, is described. The method comprises preparing a reaction mixture comprising a first structure directing agent comprising a triquaternary cation (I), a source of a first oxide of a first tetravalent element, a source of fluoride, and optionally, a source of a second oxide of a second tetravalent element, and maintaining the reaction mixture for a time and under conditions to form crystals of the molecular sieve with LTA topology.

According to a fourth aspect, a method for preparing an as-synthesized molecular sieve with a Linde Type A (LTA) topology, the method comprising preparing a reaction mixture comprising: a first structure directing agent comprising a triquaternary cation (I); and a source of a first oxide selected from a group consisting of oxides of trivalent elements, a source of a second oxide selected from a group consisting of oxides of pentavalent elements, and optionally, a source of a third oxide selected from a group consisting of oxides of metals having a +2 oxidation state and oxides of tetravalent elements, and maintaining the reaction mixture for a time and under conditions to form crystals of the molecular sieve with LTA topology.

The molecular sieves with LTA topology, methods and systems herein described can be used in connection with applications wherein use of molecular sieves is desired including, for example, purification of gas streams; separations such as the removal of water, the removal of starting materials, and the separation of small molecules; and as catalysts such as catalysts for the conversion of methanol to olefins, or for the reduction of nitrous oxides especially in exhaust applications. Exemplary applications comprise industrial chemistry applications, petroleum industry, and other applications that will be apparent to the skilled person upon a reading of the present disclosure.

The details of one or more embodiments of the disclosure are set forth in the accompanying drawings and the description below. Other features and objects will be apparent from the description and drawings, and from the claims

BRIEF DESCRIPTION OF THE DRAWINGS

The accompanying drawings, which are incorporated into and constitute a part of this specification, illustrate one or more embodiments of the present disclosure and, together with the description of example embodiments, serve to explain the principles and implementations of the disclosure.

DETAILED DESCRIPTION

Figure 1:
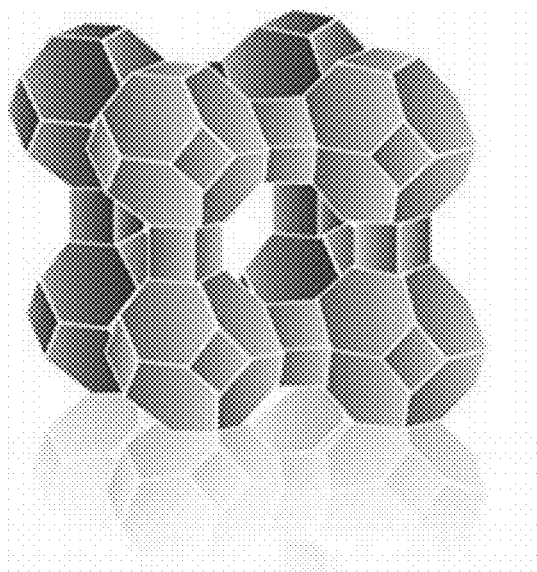
FIG. 1 illustrates an example schematic representation of the Linde Type A topology of molecular sieves, as published in the www page colloidalworld.com/images/zeolite-reflect.jpg.

Molecular sieves and related methods and structure directing agents are herein described.

The term "molecular sieve" indicates a porous solid having interconnected pores of same or different sizes, and includes (a) intermediate and (b) final or target molecular sieves and molecular sieves produced by (1) direct synthesis or (2) post-crystallization treatment (secondary synthesis). Secondary synthesis techniques allow for the synthesis of a target material having a higher Si:Al ratio from an intermediate material by acid leaching or other similar dealumination methods.

Molecular sieves of the present disclosure comprise synthetic molecular sieves such as zeolites, aluminphosphates, silicoaluminophosphates, metal-substituted aluminophosphates, germanosilicates, and pure silica molecular sieves.

Molecular sieves such as zeolites are useful in industries such as petroleum and petrochemical industries. A zeolite is an aluminosilicate having an open framework structure sharing the oxygen atoms of [Si$_{O4}$] and [Al$_{O4}$] tetrahedra or octahedra. Mobile extra framework cations reside in the pores for balancing charges along the zeolite framework. These charges are a result of substitution of a tetrahedral framework cation (e.g. Si$^{4+}$) with a trivalent or pentavalent cation. Extra framework cations counter-balance these charges preserving the electroneutrality of the framework, and these cations are exchangeable with other cations and/or protons.

Synthetic molecular sieves, such as zeolites, are typically synthesized by mixing sources of alumina and silica in an aqueous media, often in the presence of a structure directing agent or templating agent. The structure of the molecular sieve formed is determined in part by solubility of the various sources, silica-to-alumina ratio, nature of the cation, synthesis conditions (temperature, pressure, mixing agitation), order of addition, type of templating agent, and additional conditions identifiable by a skilled person.

Synthetic molecular sieves such as aluminophosphates are typically synthesized by mixing sources of alumina and phosphorus(V) oxide, possibly in the presence of a structure directing agent such as an amine or a quaternary ammonium. Silicoaluminophosphates or silicon-substituted aluminophosphates are synthesized by mixing sources of alumina, silica, and phosphorus(V) oxide. As with zeolites, the structure of aluminophosphates depend on the ratios of various components in the reaction mixture, as well as the reaction conditions as will be understood by a skilled person.

Aluminophosphates (AlPO$_4$) are a type of molecular sieve, in which Al$^{3+}$ is balanced by P$^{5+}$ to form a neutral framework structure. These materials are typically prepared by combining a source of aluminum, e.g., aluminum isopropoxide, Catapal B, or other sources of aluminum, with a source of phosphorus, e.g., phosphoric acid, along with organic structure directing agents such as amines or quaternary ammonium compounds, e.g., tetramethylammonium hydroxide, as well as a source of water. Fluoride can also be added to these reactions along with other inorganic cations, e.g. sodium, magnesium, calcium or potassium. All sources are mixed well and reacted under hydrothermal conditions.

Silicoaluminophosphates (SAPO) are a type of molecular sieve composed of Al$^{3+}$, P$^{5+}$ and Si$^{4+}$. In these frameworks, the P$^{5+}$ in an aluminophosphate structure can be replaced with Si$^{4+}$ to obtain catalytic activity. These materials are typically prepared in the same manner as aluminosphophates, described above, except that a source of silica, e.g., Tetraethylorthosilicate, Cabosil M-5 or Ludox, is added along with the other inorganic elements. Other substitutes for P$^{5+}$ in the framework comprise tetravalent elements in their +4 oxidation states such as Ge$^{4+}$, Sn$^{4+}$, Ti Zr$^{4+}$, Hf$^{4+}$, yielding molecular sieves such as germanoaluminophosphate, stannoaluminophosphate, titanoaluminophosphate, zirconium aluminophosphate, and hafnium aluminophosphate. P$^{5+}$ ions in the aluminiphosphate framework can be substituted with one or more of the tetravalent elements in the +4 oxidation state.

Metal aluminophosphates are a type of molecular sieve composed of Al$^{3+}$, P$^{5+}$ and Me$^{2+}$, where Me$^{2+}$ is any metal with a +2 oxidation state, including transition metals with a +2 transition state. In these frameworks, the Al$^{3+}$ in an aluminophosphate structure is typically replaced by Me$^{2+}$, leading to catalytic activity. These materials are typically prepared in the same manner as aluminophosphates, described above, except that a source of Me$^{2+}$ is typically added along with the other inorganics, e.g., Zn(II)Acetate. Other molecular sieves also include metal aluminophosphates wherein Al$^{3+}$ is replaced by other metals in the Periodic Table capable of having a +2 or a +4 oxidation state.

The term "Periodic Table" refers to the version of IUPAC Periodic Table of the Elements dated Jun. 22, 2007, and the numbering scheme for the Periodic Table Groups is as described in Chemical and Engineering News, 63(5), 27 (1985).

Germanosilicate molecular sieves are microporous material frameworks comprised of Si$^{4+}$ along with Ge$^{4+}$. These materials are neutral frameworks and many times the syntheses are conducted in the presence of fluoride. In a typical preparation, the aqueous organic quaternary ammonium hydroxide is combined with a source of silica, e.g., tetraethylorthosilicate, along with a source of germanium, e.g. germanium(IV) ethoxide or germanium(IV) oxide. The resulting mixture is allowed to stir until complete hydrolysis of the alkoxides is accomplished. Excess water and alcohol are then allowed to evaporate, hydrofluoric acid is typically added, and the mixture is allowed to react under hydrothermal conditions until a crystalline product forms.

The present disclosure is directed to methods of making molecular sieves having Linde Type A topology. FIG. 1 shows an exemplary schematic representation of a Linde type A (LTA) topology. As used herein, the Linde Type A topology refers with molecular sieves consistent with the structural classification given by the Structure Commission of the International Zeolite Association.

The LTA topology has been defined by the Structure Commission of the International Zeolite Association (referenced herein). It can be prepared as a pure-silica material, aluminosilicate with a composition of Si/Al=1 all the way to Si/Al=∞, a germanosilicate material, an aluminophosphate (AlPO$_4$), a silicoaluminophosphate (SAPO) or an aluminophosphate with oxidation state +2 metals substituted in the framework, e.g., Mg$^{2+}$, Zr$^{2+}$, Cr$^{2+}$, Mn$^{2+}$, Fe$^{2+}$, CO$^{2+}$, Ni$^{2+}$, Cu$^{2+}$, and other +2 oxidation state metals.

Conventional LTA, the material with Si/Al=1, is prepared using sodium cation and without any organic structure directing agents. To prepare compositions different than Si/Al=1, various organics such as tetramethylammonium, tetraethylammonium, diethanolamine, 1-benzyl-3-methyl-1H-imidazol-3-ium, and methylated julolidine (4-methyl-2,3,4,5,6,7-hexahydro-1H-pyrido[3,2,1-ij]quinolin-4-ium) have been used.

The present disclosure is directed to methods of making molecular sieves having Linde Type A topology using a triquaternary structure directing agent. According to embodiments of the present disclosure, the structure directing agent used includes a triquaternary cation.

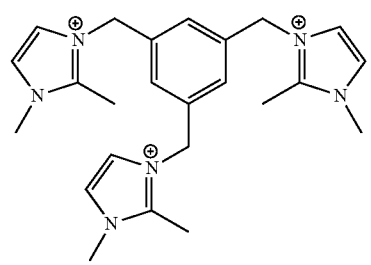

I

Figure 2:
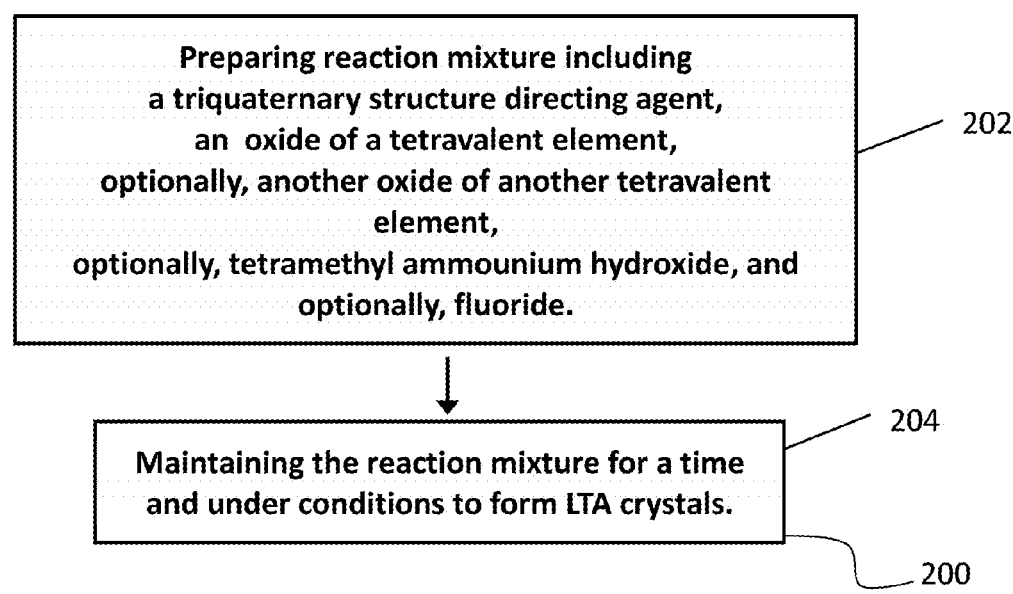
FIG. 2 provides a block diagram illustrating an exemplary method for preparing an as-synthesized molecular sieve with a Linde Type A (LTA) topology in accordance with embodiments herein described.

In several embodiments, an as-synthesized molecular sieve with a Linde Type A (LTA) topology containing at the oxide of at least one tetravalent element described in the present disclosure can be prepared by using the procedure schematically illustrated in FIG. 2. In particular, FIG. 2 illustrates a method 200 which comprise preparing a reaction mixture including a first structure directing agent comprising a triquaternary cation (I),

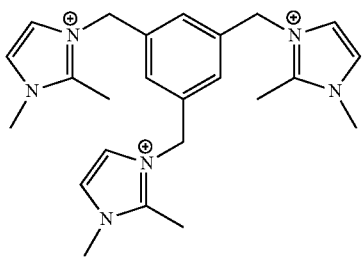

a source of a first oxide of a first tetravalent element, and a source of fluoride (202), and maintaining the reaction mixture for a time and under conditions to form crystals of the molecular sieve with LTA topology (204).

In embodiments of the method herein described, the reaction mixture can also include a source of a second oxide of a second tetravalent element. The first and second tetravalent elements can be elements from Groups 4-14 of the Periodic Table. For example, the first and second tetravalent elements can be any of silicon, germanium, titanium, tin, zirconium, or hafnium.

In one embodiment, the first tetravalent element is silicon and the second tetravalent element is germanium. The silicon-to-germanium molar ratio (Si/Ge) of the resulting germonaolicate LTA can be between 1 and 20, preferably between 2 and 5.

Sources of the first and second tetravalent elements can include sources of silicon, germanium, titanium, tin, hafnium, or zirconium. Sources of elements selected for the tetravalent elements include oxides, hydroxides, acetates, oxalates, ammonium salts and sulfates of the element(s). Sources of silicon include fumed silica, precipitated silicates, silica hydrogel, silicic acid, colloidal silica, tetra-alkyl orthosilicates (e.g. tetraethyl orthosilicate), and silica hydroxides. Examples of silica sources useful for making high-silica forms of the molecular sieves of the disclosure include fumed silica (e.g. CAB-O-SIL M-5, Cabot Corporation), hydrated silica (e.g. HI-SIL 233, PPG Industries), silica tetra alkoxides, and mixtures thereof. Also useful are colloidal forms of silica where the solid content is 30-40 wt. % $SiO_2$, and these materials can be stabilized by small amounts of sodium or ammonium cations. Sources of germanium include germanium include germanium oxide and germanium ethoxide. Examples of molecular sieves than can be synthesized using this method (200) include pure silica LTA and germanosilicate LTA. In some embodiments, the method (200) is expected to also be possibly used to synthesize other Me(1V) silicates where Me is a +4 metal, including for example titanoosilicate LTA, stannosilicate LTA, hafnium silicate LTA, and zirconium silicate LTA. It is also anticipated that this method 200 can be used to synthesize molecular sieves using oxides of 3 or more tetravalent elements, such as germanostannosilicate LTA, including molecular sieves from oxides of 4 or 5 elements.

According to an embodiment of the LTA molecular sieve synthesized using the Triquat-SDA, fluoride, and an oxide of at least one tetravalent element, the reaction mixture can also include a second structure directing agent, preferably an agent with the ability to direct the formation of Linde Type A molecular sieves. Such structure directing agents include Kryptofix 222, 18-crown-6-ether, and other LTA-structure directing agents known to those skilled in the art, such as the structure-directing agents described in the preceding paragraph. The second structure directing agent can also include a tetramethylammonium ion, such as is available from a group including tetramethylammonium hydroxide (TMAOH) and tetramethylammonium bromide (TMABr). Addition of tetramethylammonium into the reaction mixture is preferred as it accelerates the formation of molecular sieves. The ratio between the (Triquat-SDA)$_{1/3}$ and the tetramethylammonium ion can range between 1:2 to 100:1, but is preferably between 10:1 and 50:1. TMAOH can be omitted from the reaction mixture in method 100.

In some embodiments, the Si/Ge ratio of the reaction mixture can be 2 or greater, such as at or around 2 to 20, and preferably at or around 2 to 5. Where Si/Ge becomes infinite, the reaction mixture can be considered a pure silica mixture.

According to an embodiment of the LTA molecular sieve synthesized using the Triquat-SDA, fluoride, and an oxide of at least one tetravalent element, the reaction mixture can also include anions such as hydroxide, fluoride, chloride, bromide, iodide, acetate, sulfate, tetrafluoroborate and carboxylate. An exemplar of an anion for the reaction mixture is fluoride, which can be available as an aqueous salt or in the form of hydrogen fluoride (HF). Hydroxide can be available in the form TMAOH. In one embodiment, the reaction mixture contains hydroxide and fluoride ions in ratios between $1OH^-:4F^-$ to $4OH-:1F^-$, such as between $3OH^-:4F^-$ to $4OH-:3F^-$, and preferably around $1OH^-:1F^-$.

In some embodiments, preparing the reaction mixture (202) for method (200) includes combining Triquat-SDA, e.g., the bromide or hydroxide form of Triquat-SDA, with a source of a first oxide of a first tetravalent element, such as a source of silica, e.g., tetraethylorthosilicate, and a source of a second oxide of a second tetravalent element, e.g., germanium(IV) ethoxide, germanium(IV) oxide or other germanium(IV) alkoxides. Optionally, the combining can include adding a second structure directing agent to the can be added to the reaction mixture. The second structure directing agent can include for example tetramethylammonium, tetraethylammonium, diethanolamine, 1-benzyl-3-methyl-1H-imidazol-3-ium, and methylated julolidine (4-methyl-2,3,4,5,6,7-hexahydro-1H-pyrido[3,2,1-ij]quinolin-4-ium), Kryptofix 222, 18-crown-6-ether, and other LTA-structure directing agents.

In some embodiments, preparing the reaction mixture (202) can include seeding the reaction mixture with seed crystals, possibly seed crystals having LTA topology. The seed crystals can be added in order to accelerate the formation of the molecular sieves. For example, seed crystals can be at or around 0.01 µm to 10 µm in diameter, and preferably at or around 0.05 µm to 2 µm in diameter. Smaller seed crystals can result in faster molecular sieve formation. Seed crystals can be introduced in the form of free crystals in suspension, or incorporated onto solid supports (e.g. membranes).

In some embodiments, the preparing (202) of the reaction mixture can include sealing the mixture in a container and/or stirring the mixture for a time period sufficient to substantially complete the hydrolysis of alkoxides in the reaction mixture, preferably for around 12-14 hours. The term substantially complete with reference to a reaction indicate a time sufficient to have a detectable product of the reaction in the reaction mixture.

In some embodiments the preparing (202) can comprise evaporating water and/or other volatile byproducts, such as ethanol, isopropanol, and other alcohols, e.g. using a stream or air, possibly in an evaporation step. Some water can be retained after the evaporating. In some embodiments, the preparing (202) can comprise fluorinating the reaction mixture by adding fluoride to the reaction mixture, e.g. in the form of aqueous hydrogen fluoride (or hydrofluoric acid), sodium fluoride, or other fluoride salts.

In some embodiments the preparing 202 can comprise stirring the reaction mixture to form a gel, such a homogeneous gel mixture, possibly in a gelling step. In some embodiments, the maintaining 202 can also comprising heating the gel, at a temperature between 100° C. and 200° C., such as between 120° C. and 160° C., preferably between 130° C. to 150° C.

In some embodiments of the method (200), the reaction mixture can be maintained for a time and under conditions to form crystals of the molecular sieve with LTA topology (204). In particular the maintaining (204) can include heating the reaction mixture at a temperature between 100° C. and 200° C., such as between 120° C. and 160° C., preferably between 130° C. to 150° C.

In some embodiments, methods and system herein describe and related structure directing agent can be used to prepare an as-synthesized molecular sieve with a Linde Type A (LTA) topology containing at least one oxide of a trivalent element and at least one oxide of a pentavalent element.

Figure 3:
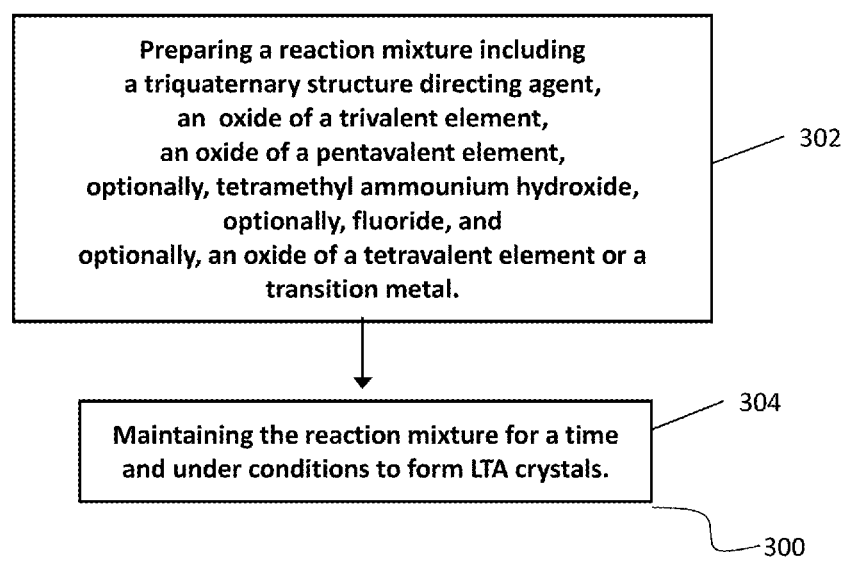
FIG. 3 provides a block diagram illustrating an exemplary method for preparing an as-synthesized molecular sieve with a Linde Type A (LTA) topology in accordance with embodiments herein described.

In particular, FIG. 3 illustrates a method (300) which comprises preparing a reaction mixture (302) including a first structure directing agent comprising a triquaternary cation (I),

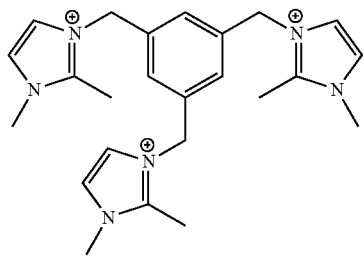

I a source of a first oxide selected from a group consisting of oxides of trivalent elements; and a source of a second oxide selected from a group consisting of oxides of pentavalent elements, and maintaining the reaction mixture for a time and under condition a time and under conditions to form crystals of the molecular sieve with LTA topology (304).

The trivalent element can be selected from a group consisting of elements from Groups 3-13 of the Periodic Table. More specifically, the trivalent element can be a metal with the +3 oxidation state, such as of gallium, aluminum, iron, boron, titanium, vanadium, and chromium. It is anticipated that the trivalent element in the +3 oxidation state can also be indium, thallium, scandium, or yttrium. Oxides of trivalent elements can be introduced into the reaction mixture in the form of hydroxides, acetates, oxalates, ammonium salts and sulfates of the trivalent elements. Typical sources of aluminum oxide include aluminates, alumina, and aluminum compounds such as Al(isopropoxide)$_3$, AlCl$_3$, Al(NO$_3$)$_3$, Al$_2$(SO$_4$)$_3$, Al(OH)$_3$, kaolin clays, and other zeolites. An example of the source of aluminum oxide is LZ-210 zeolite (a type of Y zeolite). Boron, gallium, and iron can be added in forms corresponding to their aluminum and silicon counterparts.

The pentavalent element can be selected from a group consisting of elements from Groups 5-13 of the Periodic Table. More specifically, the pentavalent element can be any of phosphorus, arsenic, antimony, and bismuth. Sources of pentavalent elements include oxides, hydroxides, acetates, oxalates, ammonium salts and sulfates of the pentavalent elements. Typical sources of phosphorus(V) oxide include phosphates and phosphoric acid. Phosphorus(V) oxide can also be obtained from using other microporous materials as the source of aluminum and phosphorous where the source material is added, breaks down in the reaction mixture and the new material is formed.

In one embodiment, the reaction mixture can include a source of a third oxide selected from group consisting of oxides of metals having an oxidation state of +2 and oxides of tetravalent elements. The metals having a +2 oxidation state can be transition metals such as zinc, iron, cobalt, copper, iron, manganese, and nickel. These metals can also be non-transition metals such as magnesium. Metals can be introduced in the reaction mixture in the form of metal oxides, hydroxides, acetates, halides, oxalates, ammonium salts and sulfates. For example, sources for transition metals for the third oxide include transition metal (II) acetates, e.g., Me(CH$_3$COO$^-$)$_2$, and transition metal halides, e.g., MeCl$_2$, where Me is a transition metal with a +2 oxidation state. In embodiments where the oxide of a transition metal is introduced into the reaction mixture, the molecular sieves synthesized include transition metal(II)-substituted aluminophosphates such as zinc-, iron-, cobalt-, copper-, iron-, manganese-, and nickel-aluminophosphate, and other metal (II)-substituted aluminophosphates such as magnesium-aluminophosphate.

In some embodiments, the oxides of tetravalent elements can be oxides of elements from Groups 4-14 of the Periodic Table. For example, the tetravalent elements can be any of silicon, germanium, titanium, tin, hafnium, or zirconium. In one embodiment, the tetravalent element is silicon and the oxide is silicon dioxide.

Sources of the tetravalent elements include oxides, hydroxides, acetates, oxalates, ammonium salts and sulfates of the element(s). Sources of silicon include fumed silica, precipitated silicates, silica hydrogel, silicic acid, colloidal silica, tetra-alkyl orthosilicates (e.g. tetraethyl orthosilicate), and silica hydroxides. Examples of silica sources useful for making high-silica forms of the molecular sieves of the disclosure include fumed silica (e.g. CAB-O-SIL M-5, Cabot Corporation), hydrated silica (e.g. HI-SIL 233, PPG Industries), silica tetra alkoxides and mixtures thereof. Also useful are colloidal forms of silica where the solid content is 30-40 wt. % SiO$_2$, and these materials can be stabilized by small amounts of sodium or ammonium cations. Sources of germanium include germanium include germanium oxide and germanium ethoxide. Examples of molecular sieves that incorporate the fourth oxide include silicoaluminophosphates, germanoaluminophosphates, stannoaluminophosphates, titanoaluminophosphates and the like.

According to an embodiment of the LTA molecular sieve synthesized using the Triquat-SDA and oxides of a trivalent and a pentavalent element, the reaction mixture can also include a second structure directing agent, preferably an agent with the ability to direct the formation of Linde Type A molecular sieves. Such structure directing agents include Kryptofix 222, 18-crown-6-ether, and other LTA-structure directing agents known to those skilled in the art such as the structure-directing agents described in the preceding paragraph. The second structure directing agent can also include a tetramethylammonium ion, such as is available from a group including tetramethylammonium hydroxide (TMAOH) and tetramethylammonium bromide (TMABr). Addition of tetramethylammonium into the reaction mixture is preferred as it accelerates the formation of molecular sieves. The ratio between the (Triquat)$_{1/3}$ and the tetramethylammonium ion can range between 1:2 to 100:1, but is preferably between 10:1 and 50:1. TMAOH can be omitted from the reaction mixture in method 100.

The reaction mixture can also include at least one anion from a group consisting of hydroxide, fluoride, chloride, bromide, iodide, acetate, sulfate, tetrafluoroborate and carboxylate. An exemplar of such an anion is fluoride, such as can be obtained from hydrogen fluoride or ammonium fluoride. The presence of fluoride in the reaction mixture can accelerate the formation of molecular sieves. Hydroxide can be available in the form TMAOH or Triquat(OH)$_3$. In one embodiment, the reaction mixture can contain more than one anion. For example, the reaction mixture contains hydroxide and fluoride ions in ratios between 1OH$^-$:4F$^-$ to 4OH–:1F$^-$, such as between 3OH$^-$:4F$^-$ to 4OH–:3F$^-$, and preferably around 1OH$^-$:1F$^-$.

In one embodiment, a Al:P molar ratio of 1:1 is preferred for a reaction mixture intended for synthesizing aluminophosphate. For synthesizing silicoaluminophosphate, the preferred molar ratio of Al:P:Si in the reaction mixture is 1:1:(0.01-0.5). For metal-substituted aluminophosphates such as transition metal aluminophosphates, the preferred Al:P:Me ratio is 1:1:(0.01-0.2).

In an embodiment, preparing the reaction mixture (302) for method (300) can be performed by combining Triquat-SDA, e.g., the bromide or hydroxide form of Triquat-SDA, with a source of a first oxide of a trivalent element, e.g., aluminum isopropoxide, and possibly, a source of a third oxide of a metal, e.g. source of a metal(II) such as zinc, iron, cobalt, copper, iron, magnesium, manganese, and nickel. A source of a second oxide of a pentavalent element, e.g., phosphoric acid, can then be added to the reaction mixture, and the reaction mixture can be sealed in a container closed and stirred for a period of time sufficient to achieve a substantially homogeneous mixture, preferably for around 15 minutes.

In some embodiments, the preparing (302) can comprise fluorinating the reaction mixture, by adding fluoride to the reaction mixture, e.g. in the form of aqueous hydrogen fluoride possibly in a fluorination step. In an embodiment directed to synthesis of the silicon-substitute aluminophosphate LTA, the fluorinating can be omitted.

In some embodiments, the preparing (302) can also include seeding the reaction mixture with seed crystals, possibly seed crystals having LTA topology. The seed crystals can be added in order to accelerate the formation of the molecular sieves. For example, seed crystals can be at or around 0.01 μm to 10 μm in diameter, and preferably at or around 0.05 μm to 2 μm in diameter. Smaller seed crystals can result in faster molecular sieve formation. Seed crystals can be introduced in the form of free crystals in suspension, or incorporated onto solid supports (e.g. membranes).

In some embodiments, the preparing (302) comprise stirring the reaction mixture to form a gel, such a homogeneous gel mixture, possibly in a gelling step.

In some embodiments, the method (300) can then proceed to maintaining the reaction mixture (304) for a time and under conditions to form crystals of the molecular sieve with LTA topology. In some embodiments, the maintaining can include heating the reaction mixture at a temperature between 100° C. and 200° C., such as between 140° C. and 200° C., preferably between 160° C. to 180° C.

For each embodiment described herein, the molecular sieve reaction mixture can be supplied by more than one source of a given reagent. For example in some embodiments, silica can be supplied to the reaction by both a fumed silica source and from another molecular sieve added to provide an Al source. The molecular sieve provided can also provide some silica. Also, in one embodiment, two or more reaction components can be provided by one source, such as, for example, where tetramethylammonium hydroxide is used to provide the second structure directing agent and the hydroxide for making germanium silicate LTA. Crystal size, morphology and crystallization time of the molecular sieve described herein can vary with the nature of the reaction mixture and the crystallization conditions.

In embodiments where the molecular sieve formed is an intermediate material, the process of the present disclosure can further include synthesizing a target molecular sieve by post-synthesis techniques, such as acid leaching. Usually, it is desirable to remove the alkali metal cation by ion exchange and replace it with hydrogen, ammonium, or any desired metal ion. The molecular sieve can be leached with chelating agents, e.g., EDTA or dilute acid solutions, to increase the silica to alumina mole ratio. The molecular sieve can also be steamed; steaming helps stabilize the crystalline lattice to attack from acids.

In some embodiments by varying the starting inorganic compounds, a variety of molecular sieves can be obtained using the method of the present disclosure. Examples of such a resulting molecular sieve are LTA and AST, described above, each of which is defined in accordance with the rules approved by the Structure Commission of the International Zeolite Association. Complete information on the structure and properties of each of LTA and AST can be found at the www page iza-structure.org/databases, the entire content of which is incorporated herein by reference.

In some embodiments, after a reaction mixture has been prepared as described herein above, the reaction mixture can be maintained under crystallization conditions sufficient to form the molecular sieve. Such conditions are generally known. (See, Harry Robson, *Verified Syntheses of Zeolitic Materials*, $2^{nd}$ revised edition, Elsevier, Amsterdam (2001)). For example, the reaction mixture can be maintained at an elevated temperature until the molecular sieve is formed over a period of a few days to several weeks. The hydrothermal crystallization is usually conducted under autogeneous pressure, ranging from 50-200 PSI (0.34 MPa to 1.38 MPa), and usually in an autoclave so that the reaction mixture is subject to autogenous pressure, at a temperature between 125° C. and 200° C.

In some embodiments the reaction mixture can be subjected to mild stirring or agitation during crystallization. It will be understood by a person skilled in the art that the molecular sieves described herein can contain impurities, such as amorphous materials, unit cells having framework topologies which do not coincide with the molecular sieve, and/or other impurities (e.g., organic hydrocarbons). During hydrothermal crystallization, the molecular sieve crystals can be allowed to nucleate spontaneously from the reaction mixture.

The use of crystals of the molecular sieve as seed material can result in decreasing the time necessary for complete crystallization to occur. In addition, seeding can lead to an increased purity of the product obtained by promoting the nucleation and/or formation of the molecular sieve over any undesired phases. When used as seeds, seed crystals are added in an amount between 0.01% and 10% of the mass of the total amount of oxide in the reaction mixture. The total amount of oxide refers to the total mass of oxides in the reaction mixture gel prior to heating, including but not limited to silica, alumina, germanium(IV) oxide, phosphorus (V) oxide, and other metal oxides. Once the molecular sieve has formed, the solid product is separated from the reaction mixture by standard mechanical separation techniques such as filtration. The crystals are water-washed and then dried to obtain the as-synthesized molecular sieve crystals. The drying can be performed at atmospheric pressure or under vacuum, and possibly at an elevated temperature, most preferably around 100° C.

In several embodiments the molecular sieve obtained with methods herein described can be used as-synthesized, or can be thermally treated (calcined). The term "as-synthesized" refers to the molecular sieve in its form after crystallization, prior to removal of the structure directing agent. The structure directing agent can be removed by thermal treatment (e.g., calcination), preferably in an oxidative atmosphere (e.g., air, gas with an oxygen partial pressure of greater than 0 kPa) at a temperature readily determinable by one skilled in the art sufficient to remove the structure directing agent from the molecular sieve. The structure directing agent can also be removed by photolysis techniques (e.g. exposing the structure directing agent-containing molecular sieve product to light or electromagnetic radiation that has a wavelength shorter than visible light under conditions sufficient to selectively remove the organic compound from the molecular sieve) as described in U.S. Pat. No. 6,960,327 to Navrotsky and Parikh, issued Nov. 1, 2005.

In some embodiments, the molecular sieve obtained with methods herein described can be calcined in steam, air or inert gas at temperatures ranging from about 200° C. to about 800° C. for periods of time ranging from 1 to 48 hours, or more. Structure directing agents can also be removed using oxidation processes, such as the oxidization of organic compounds using ozone. Ozone can also be used to remove organic structure directing agents at either room temperature or elevated temperatures, such as between 75° C. and 250° C., preferably at temperatures between 125° C. and 175° C., such as at 150° C., which can prevent severe degradation of the molecular sieve framework, Usually, it is also desirable to remove the extra-framework cations (e.g. $H^+$) by ion-exchange or other known method and replace it with hydrogen, ammonium, or any desired metal-ion.

In embodiments, in which the molecular sieve formed is an intermediate material, the target molecular sieve can be achieved using post-synthesis techniques to allow for the synthesis of a target material having a higher Si:Al or other analogous ratios from an intermediate material by acid leaching or other similar dealumination methods.

Molecular sieves synthesized by the processes of the present disclosure can be characterized by their XRD pattern. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation and from variations in the Si/Al or other mole ratios from sample to sample. Calcination can also cause minor shifts in the XRD pattern. Notwithstanding these minor perturbations, the basic crystal lattice structure remains unchanged.

The powder X-ray diffraction patterns presented herein were collected by standard techniques. The radiation was CuK-α radiation. The peak heights and the positions, as a function of 2θ, where θ is the Bragg angle, were read from the relative intensities of the peaks (adjusting for background), and d, the interplanar spacing in Angstroms corresponding to the recorded lines, can be calculated.

In some embodiments, the molecular sieve catalyst of the present disclosure can optionally be combined with one or more catalyst supports, active base metals, other molecular sieves, promoters, and mixtures thereof. Examples of such materials and the manner in which they can be used are disclosed in U.S. Pat. No. 4,910,006, issued May 20, 1990 to Zones et al., and U.S. Pat. No. 5,316,753, issued May 31, 1994 to Nakagawa.

In several embodiments, metals can also be introduced into molecular sieves herein described by replacing some of the cations in the molecular sieve with metal cations via standard ion exchange techniques known in the art. Typical replacing cations can include metal cations, e.g., rare earth, Group IA, Group IIA and Group VIII metals, as well as their mixtures. Examples of the replacing metallic cations include cations of metals such as rare earth, manganese, calcium, magnesium, zinc, cadmium, platinum, palladium, nickel, cobalt, titanium, aluminum, tin and iron.

In some embodiments, the hydrogen, ammonium, and metal components can be ion-exchanged into the molecular sieves of the disclosure. The molecular sieves of the disclosure can also be impregnated with the metals, or the metals can be physically and intimately admixed with the molecular sieves of the disclosure using standard methods known to the art. Typical ion-exchange techniques involve contacting the synthetic molecular sieve with a solution containing a salt of the desired replacing cation or cations. Although a wide variety of salts can be employed, chlorides and other halides, acetates, nitrates, and sulfates are particularly preferred. The molecular sieve is usually calcined prior to the ion-exchange procedure to remove the organic matter present in the channels and on the surface, since this approach results in a more effective ion exchange. Representative ion exchange techniques are known in the art.

In some embodiments, following contact with the salt solution of the desired replacing cation, the molecular sieve is typically washed with water and dried at temperatures ranging from 65° C. to about 200° C. After washing, the molecular sieve can be calcined in air or inert gas as described above, to produce a catalytically active product especially useful in hydrocarbon conversion processes. Regardless of the cations present in the as-synthesized form of the molecular sieves of the disclosure, the spatial arrangement of the atoms which form the basic crystal lattice of the molecular sieve remains essentially unchanged.

The molecular sieves made with the methods of the present disclosure can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the molecular sieve can be extruded before drying, or, dried or partially dried and then extruded.

The molecular sieves made with the methods of the present disclosure can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. No. 4,910,006, issued May 20, 1990 to Zones et al., and U.S. Pat. No. 5,316,753, issued May 31, 1994 to Nakagawa, both of which are incorporated by reference herein in their entirety.

The molecular sieves made with the methods of the present disclosure are useful in catalysts for a variety of hydrocarbon conversion reactions such as hydrocracking, dewaxing, isomerization and the like. The molecular sieves made from the process of the present disclosure can be also useful as adsorbents and as low-dielectric K materials. Exemplary uses of the molecular sieve having low dielectric K potential are described in U.S. Pat. No. 7,138,099 incorporated herein by reference in its entirety.

EXAMPLES

The molecular sieves, structure directing agents and related methods and system herein described are further illustrated in the following examples, which are provided by way of illustration and are not intended to be limiting.

In particular, the following examples illustrate exemplary synthesis and uses of molecular sieves using the triquat structure directing agent (Triquat). A person skilled in the art will appreciate the applicability of the features described in detail for Triquat and its related molecular sieves to additional SDA having different substituents, and to related molecular sieves.

The following experimental procedures and characterization data were used for all compounds and their precursors exemplified herein.

Example 1: Synthesis and Confirmation of the Triquat Structure Directing Agent

Unless otherwise noted, all reagents were purchased from Sigma-Aldrich and were used as received. Hydroxide ion exchanges were performed using strongly basic hydroxide exchange resin. Titrations were performed using a Mettler-Toledo DL22 autotitrator using 0.01 M HCl as the titrant. All liquid NMR spectra were recorded with a 400 MHz Varian Spectrometer.

Figure 4:
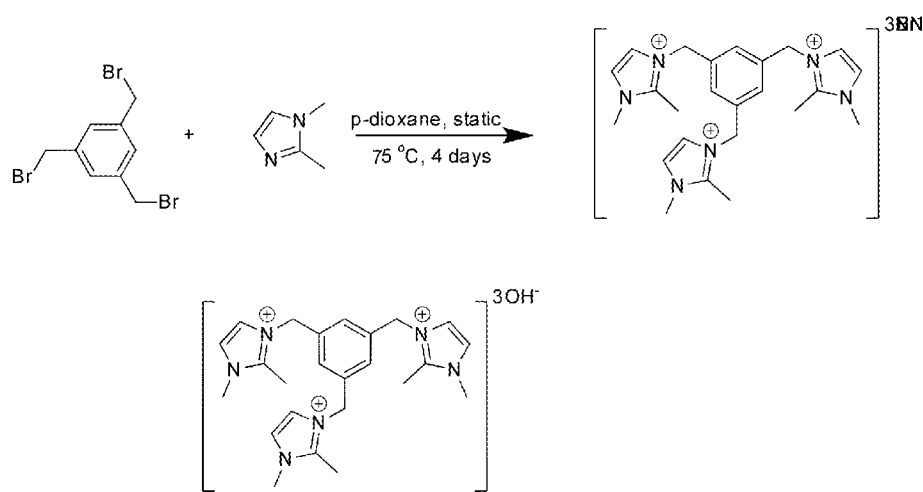
FIG. 4 illustrates a method for synthesizing the Triquat structure directing agent according to an embodiment of the present disclosure.

The Triquat structure directing agent of formula (I) used in this work was synthesized y the general scheme shown in FIG. 4.

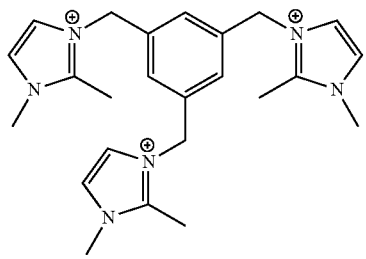
(I)

A typical synthesis is as follows: 300 mmol (28.8 g) of 1,2-dimethylimidazole are dissolved in 250 mL of p-dioxane at room temperature in a 500 mL round bottom flask. Then 84 mmol (30 g) of 1,3,5-Tris(bromomethyl)benzene was added to the solution. The resulting solution was heated to 75° C. without stirring under an argon atmosphere with a condenser. The mixture was allowed to react statically for four days. After this time the mixture was cooled and the solvent was removed using rotary evaporation. The resulting solid was recrystallized twice using absolute ethanol.

Figure 5:
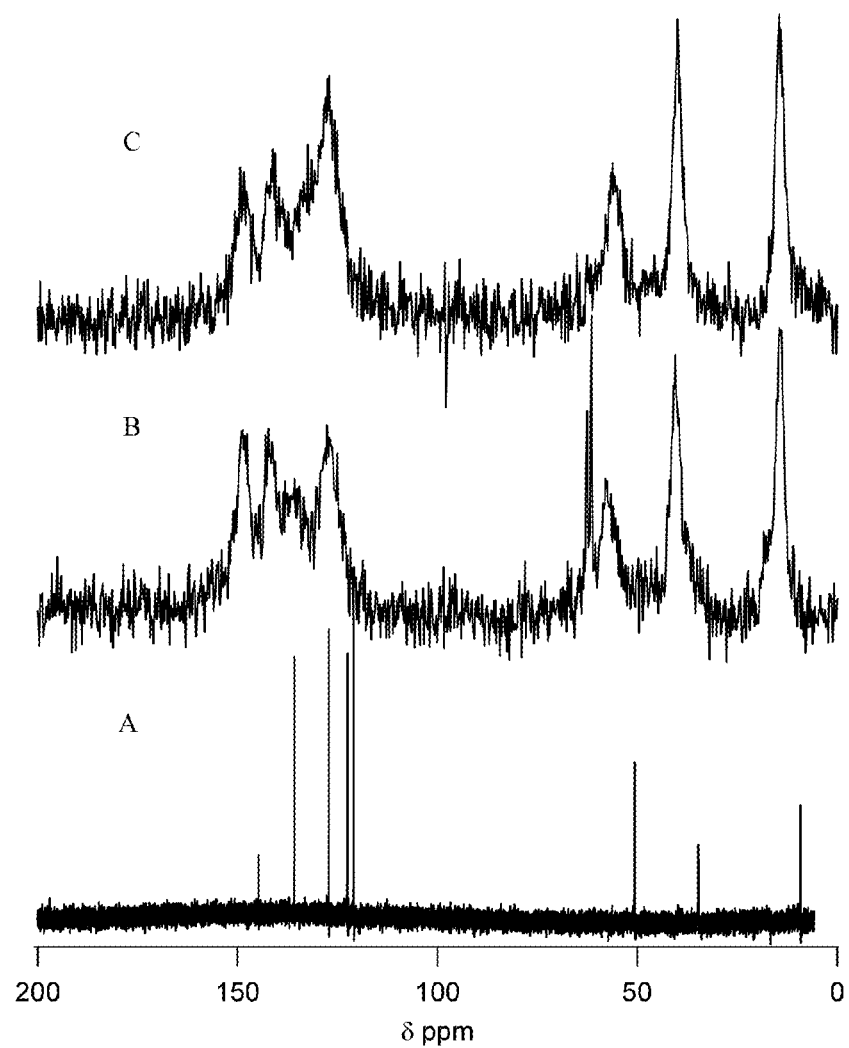
FIG. 5 illustrates the following $^{13}C$ NMR spectra: (a) $^{13}C$ liquid NMR of Triquat, (b) $^{13}C$ CPMAS NMR of an AST/LTA mixture showing presence of TMAOH and (c) $^{13}C$ CP-MAS NMR of pure-phase LTA according to an embodiment of the present disclosure.

The product in its bromide form was then hydroxide exchanged and the complete hydroxide exchange was confirmed using titration and the product was normally concentrated to 0.3-0.4 mmol $OH^-$/g. The product was verified using both $^1H$ and $^{13}C$ liquid NMR. The product in its bromide form was then hydroxide exchanged, concentrated using rotary evaporation, titrated and stored in a refrigerator. $^1H$-NMR (500 MHz, $D_2O$): δ 2.56 (s, 9H), 3.81 (s, 9H), 5.37 (s, 3H), 7.18 (s, 3H), 7.33 (d, 3H), 7.40 (d, 3H). $^{13}C$-NMR (125 MHz, $D_2O$): δ 9.86, 35.47, 51.38, 121.67, 123.19, 127.83, 136.54, 145.52. The $^{13}C$ NMR of the product is shown in FIG. 5.

General Procedures for the Synthesis and Characterization of Microporous Materials A general synthesis procedure for the molecular sieves or microporous materials can be found below. In all situations where a rotating oven was used, the samples were spun at 43 rpm. All powder X-ray diffraction (XRD) characterizations were conducted on a Rigaku MiniFlex II with Cu Kα radiation. All TGA/DSC measurements were performed on Netzsch STA 449C Jupiter. Unless otherwise noted, samples were heated in air to 600° C. at a rate of 1 K/min, and then held at 600° C. for two hours to ensure complete combustion of the organic. 13C CP-MAS solid-state NMR spectra were recorded on a Bruker CXP-200 spectrometer (4.7 T) with a Bruker 7 mm MAS probe at a spectral frequency of 50.29 MHz with a rotation rate of 4000 Hz and were referenced relative to adamantane as an external standard (2 ms contact time, 2 s delay). SEM images were acquired on a ZEISS 1550 VP FESEM, equipped with in-lens SE. EDS spectra were acquired with an Oxford X-Max SDD X-ray Energy Dispersive Spectrometer system. All nitrogen isotherms were performed at 77K and argon isotherms were performed at 87K using a Quantachrome Autosorb iQ.

Examples 2: Synthesis and Characterization of Aluminophosphates

Gel molar ratios used to prepare aluminophosphates are as follows:

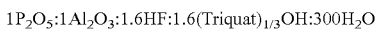

The following procedure was used for the syntheses, it was found to be sensitive to mixing times. The Triquat in hydroxide form was mixed with aluminum isopropoxide and stirred for 1 hour in a covered vessel. Phosphoric acid was then added to the gel, and it was stirred while covered for 15 minutes. Finally, the gel was transferred to a Teflon Parr Reactor and, if necessary, HF was added directly to the reactor. The reactor was sealed and manually shaken to ensure good mixing of the reagents. The reactor was placed in either a static or rotating oven at 160 to 180° C. No differences in the product were found in this temperature range.

Figure 6:
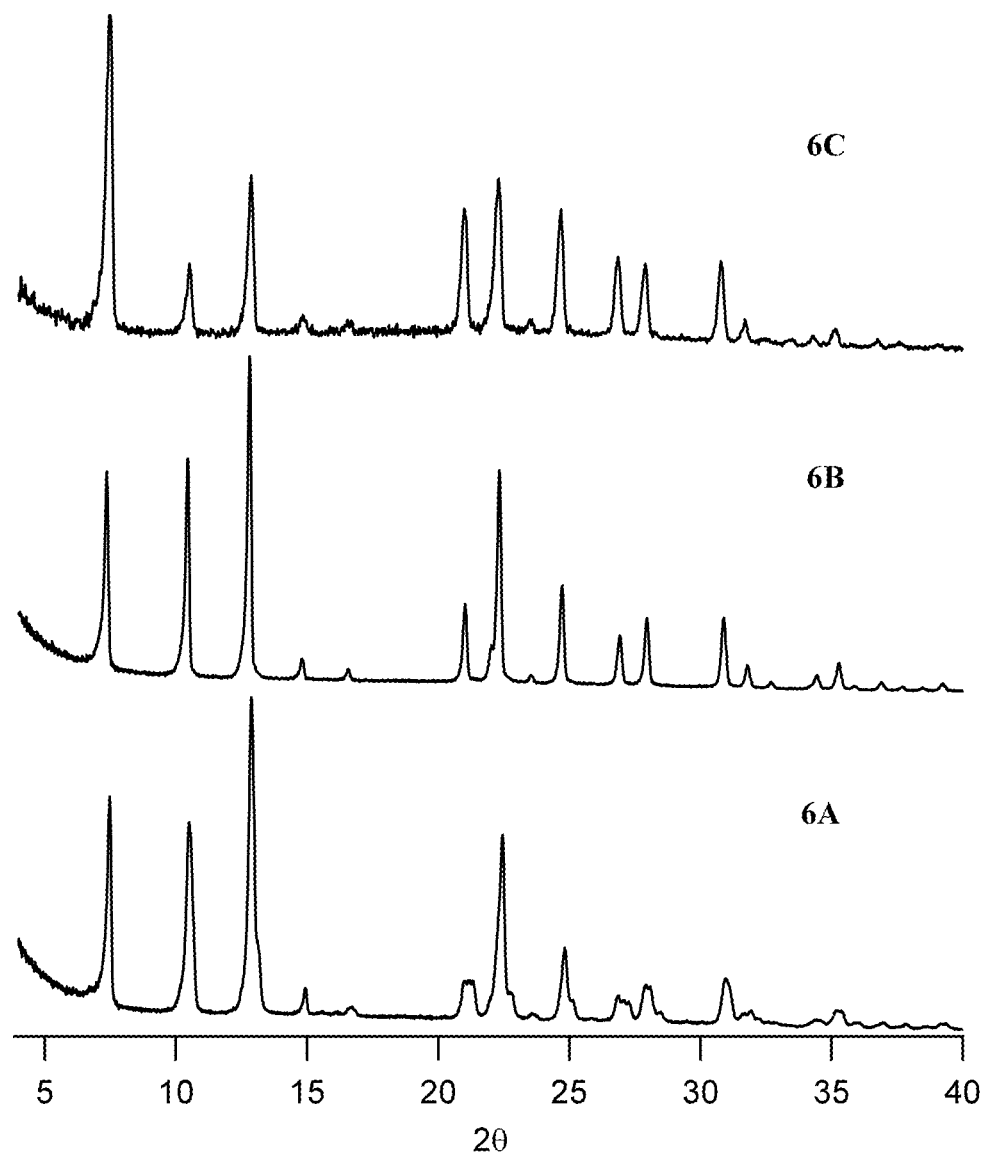
FIG. 6 illustrates the power x-ray diffraction (XRD) patterns of as-made: $AlPO_4$ LTA with fluoride (FIG. 6A), SAPO LTA with fluoride (FIG. 6B) and SAPO LTA without fluoride (FIG. 6C), according to an embodiment of the present disclosure.

When the Triquat was used in aluminophosphate reactions with or without fluoride, the only product obtained was aluminophosphate LTA ($AlPO_4$-42); a powder x-ray diffraction (XRD) pattern of a representative sample is shown in FIG. 6A. With the addition of fluoride, Triquat-SDA catalyzed the formation of aluminophosphate LTA in as little as four hours, and the material produced was stable under reaction conditions for at least 150 hours. Triquat-SDA was also able to produce AlPO$_4$ LTA without the addition of fluoride, however, the synthesis time was on the order of days rather than hours.

To form a more complete understanding of the system being studied the AlPO$_4$ material was also synthesized with the following gel composition. The same method was used for the ZnAPO without the addition of zinc acetate and will be discussed below.

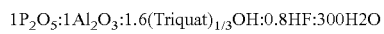

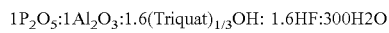

Figure 7:
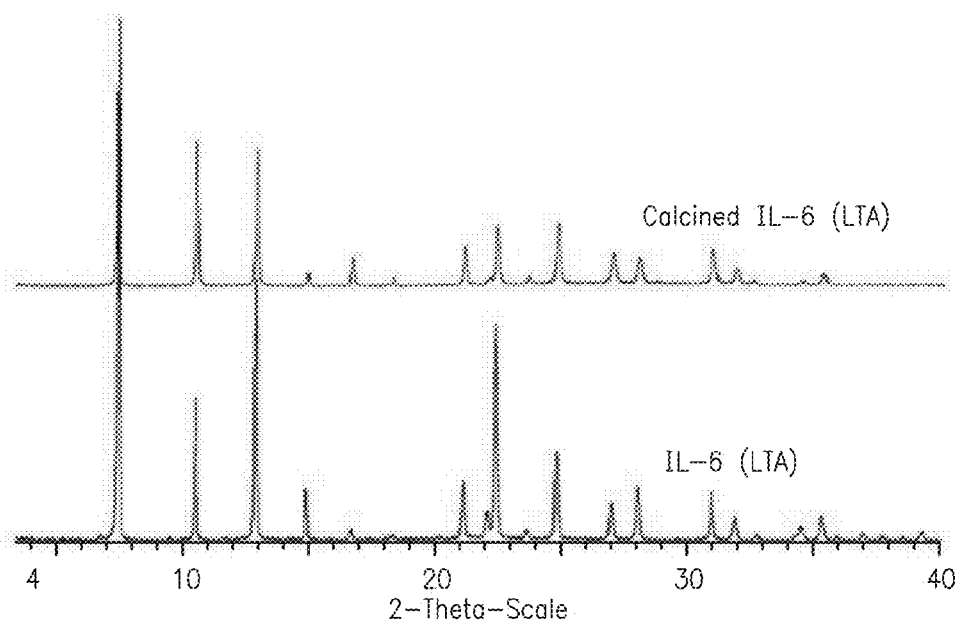
FIG. 7 illustrates XRD patterns of $AlPO_4$-LTA, as published in Fayad, E.; Bats, N.; Kirschhock, C. A.; Rebours, B.; Quoineaud, A.; Martens, J. A Rational Approach to the Ionothermal Synthesis of an $AlPO_4$ Molecular Sieve with an LTA-Type Framework. *Angewandte Chemie International Edition* 2010, 49, 4585-4588.
Figure 8:
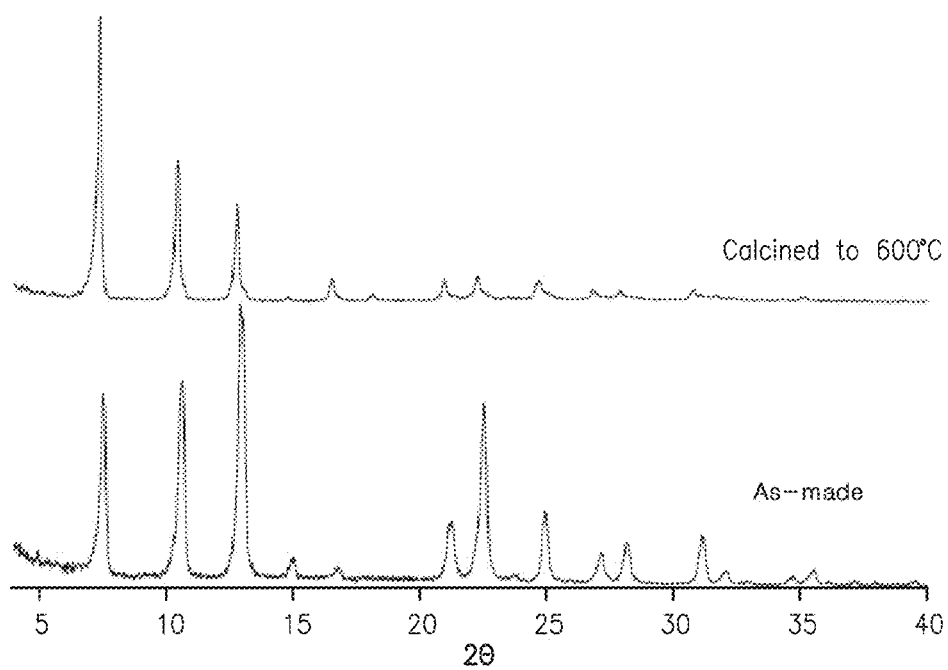
FIG. 8 illustrates XRD patterns of calcined $AlPO_4$ made with the Triquat-SDA according to an embodiment of the present disclosure.

The resulting AlPO$_4$ is somewhat stable to calcination to 600° C. as shown in FIG. 8 and showed an organic loss of 23.5%. The XRD of the material also bears similarities to LTA, as with the other materials made. Several groups have published XRD patterns of AlPO$_4$-LTA, and a representative example is in FIG. 7. See Fayad, E.; Bats, N.; Kirschhock, C. A.; Rebours, B.; Quoineaud, A.; Martens, J. A Rational Approach to the Ionothermal Synthesis of an AlPO4 Molecular Sieve with an LTA-Type Framework. *Angewandte Chemie International Edition* 2010, 49, 4585-4588. Based on comparison of the XRD patterns of the as-made material to published patterns it is believed that this material is indeed AlPO$_4$-LTA. In order to measure the micropore volume the successful literature procedure for removing a different template from AlPO$_4$-LTA was repeated here. The material was calcined in air for 12 hours at 400° C. in a TGA, after which time no further mass loss was observed, but a total organic loss of only 13% was found.

After calcinations, the product changed from white to a dark brown color, suggesting that organic material was still present. Additionally a subsequent thermogravimetric analysis (TGA) to 750° C. showed an additional organic loss of 7% and the material was white after this treatment, though somewhat amorphous as XRD showed. The nitrogen isotherm of this material gave a micropore volume of 0.051 cm3/g, therefore this method is insufficient to remove Triquat-SDA.

Examples 3: Synthesis and Characterization of Silicon-Substituted Aluminophosphates Silicon can be incorporated in the framework by adding TEOS to the syntheses along when the aluminum isopropoxide is added. For the synthesis of silicon-substituted aluminophosphates (SAPOs), gel molar ratios were adjusted to:

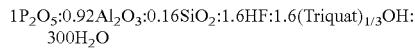

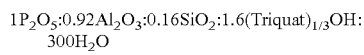

The Triquat hydroxide was mixed with tetraethylorthosilicate (TEOS) and aluminum isopropoxide and stirred for 1 hour in a covered vessel. Phosphoric acid was then added to the gel, and it was stirred while covered for 15 minutes. Finally the gel was transferred to a Teflon Parr Reactor, and the HF was added directly to the reactor. The reactor was sealed and manually shaken for several minutes to ensure good mixing of the reagents. The reactor was placed in either a static or rotating oven between 160 and 180° C. It is preferable not to allow time for the alcohols produced from the hydrolysis of the aluminum isopropoxide and tetraethylorthosilicate (TEOS) to evaporate; the exact cause of this is not known, but is likely a complex interaction of aging time and initial pH. It was determined that the optimal fluoride to hydroxide concentration to use is 1F$^-$:1OH$^-$.

Figure 34:
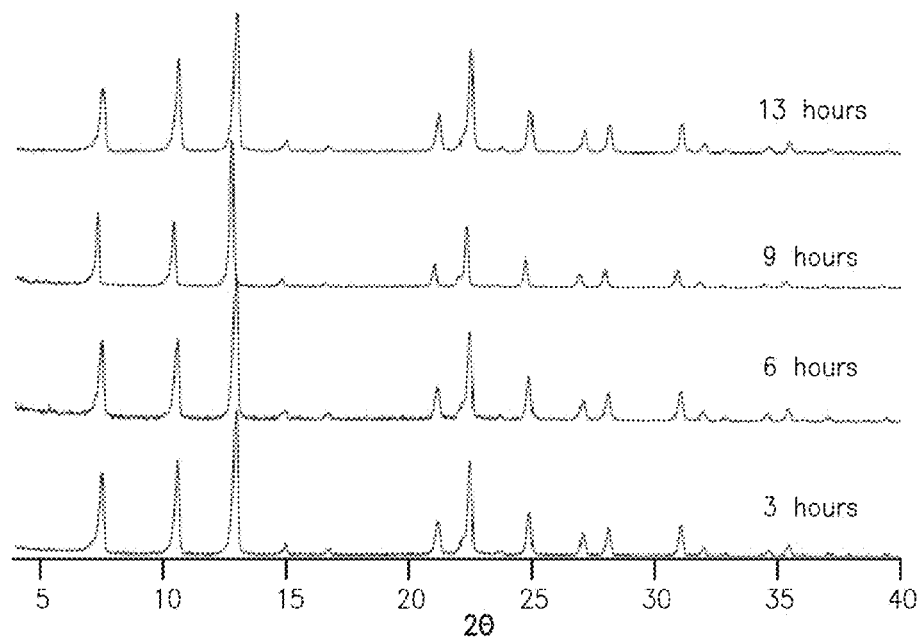
FIG. 34 illustrates the XRD traces of SAPO LTA as a function of reaction time, according to an embodiment of the present disclosure.
Figure 35:
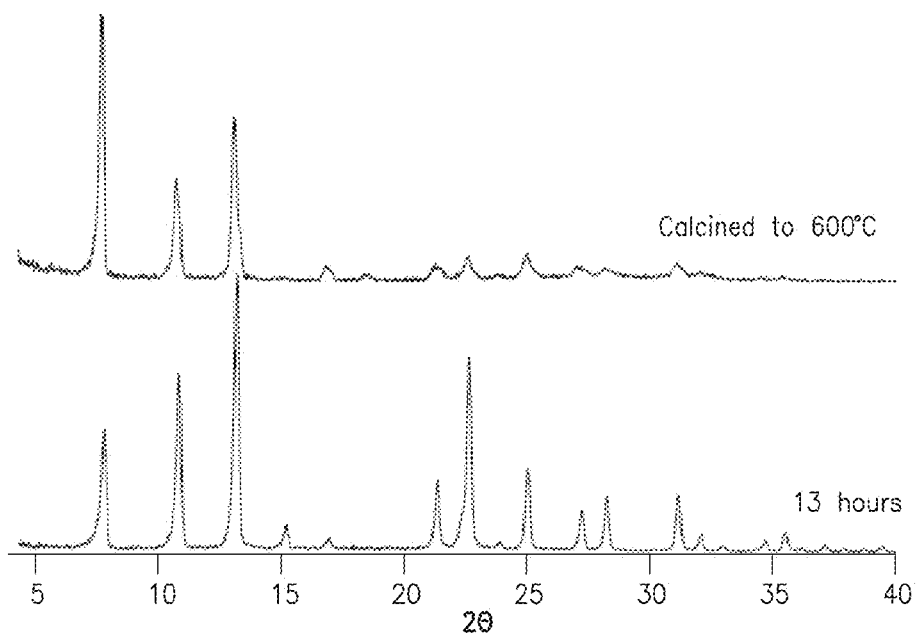
FIG. 35 illustrates the XRD of germanosilicate LTA/AST with Si/Ge=2, according to an embodiment of the present disclosure.

The XRD traces as a function of reaction time are shown in FIG. 34. The material was moderately stable to calcination as confirmed by XRD in FIG. 35. TGA of the material showed an organic loss of 25.1%. EDS showed that silicon was in the material, in an amount consistent with the synthesis gel composition.

The XRD of the SAPO LTA synthesized with fluoride, as shown in FIG. 6B, shows that there are no impurities present in the final product. The SAPO material can also be made without fluoride, as shown in its XRD in FIG. 6C.

Figure 9:
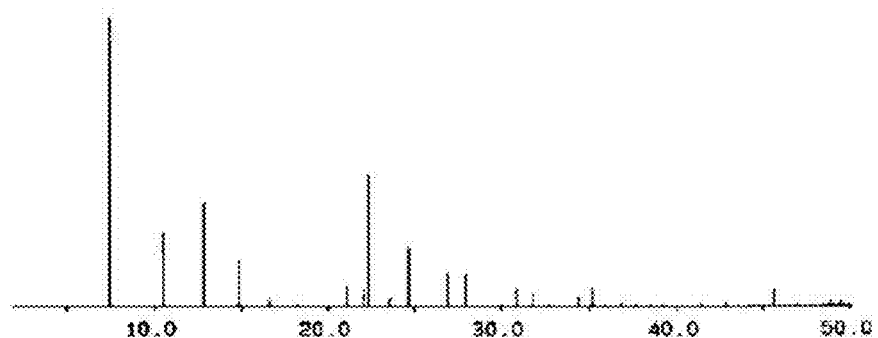
FIG. 9 illustrates XRD patterns of. SAPO-LTA, as published in Sierra, L.; Deroche, C.; Gies, H.; Guth, J. Synthesis of new microporous $AlPO_4$ and substituted derivatives with the LTA structure. *Microporous Materials* 1994, 3, 29-38.

The XRD of the as-made SAPO material made with Triquat-SDA is LTA. The SAPO-LTA was first disclosed by Union Carbide and has since been replicated by several sources. A representative XRD can be found in FIG. 9. By comparing these patterns it can be seen that the SAPO synthesized with Triquat-SDA as shown in FIGS. 6B and 6C are a match for the SAPO-LTA framework.

Figure 10:
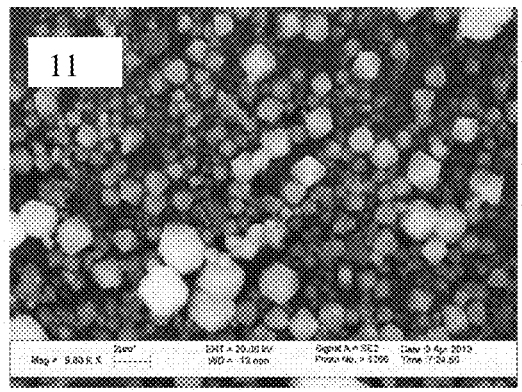
FIG. 10 illustrates scanning electron microscope (SEM) images of: (a) SAPO LTA (FIG. 10A), (b) germanosilicate LTA with gel Si/Ge=2 (FIG. 10B), and (c) germanosilicate LTA with high gel Si/Ge (FIG. 10C), according to an embodiment of the present disclosure.
Figure 10:
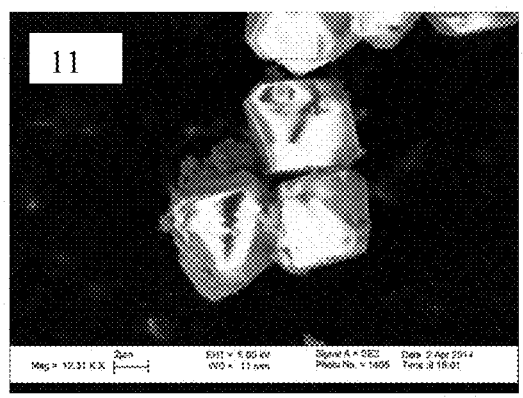
Figure 10:
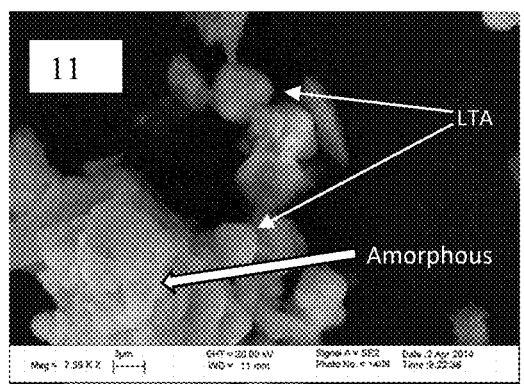

A scanning electron microscope (SEM) image showing the morphology of the SAPO material made with fluoride is shown in FIG. 10A. In the fluoride syntheses, the morphology is more consistent with previously reported rhombohedral LTA, rather than the typical cubic morphology that is normally reported, however, the XRD pattern does not show any evidence of peak splitting which would be encountered in this symmetry.

While the XRD of the material shows that it is of LTA framework topology it appears that the framework degrades upon calcination. This can be observed in the loss of peaks in the XRD and also from the nitrogen isotherms (not shown). LTA should have a much larger micropore volume, for example an AlPO$_4$-LTA that the template was successfully removed from has a nitrogen micropore volume of 0.23 cm$^3$/g and pure silica LTA has an argon micropore volume of 0.24 cm$^3$/g. For the material calcined to 600° C. in air, a micropore volume of 0.130 cm$^3$/g was found by nitrogen adsorption. Additionally, the organic was also removed by first pyrolyzing in argon at 600° C. and then calcining in air at 600° C., resulting in a micropore volume of 0.129 cm$^3$/g. Since the micropore volumes are low it suggests that the framework is being damaged by these calcination procedures.

The catalytic activity for methanol to olefins reaction (MTO) was also measured for the material which had been calcined in air to 580° C. (with some framework damage) and it showed approximately 80% conversion of methanol with the majority of the products being propylene and ethylene.

Examples 4: Synthesis and Characterization of Zinc Aluminophosphates

Zinc-substituted aluminophosphates (ZnAPO) were synthesized using fluoride in the following gel compositions.

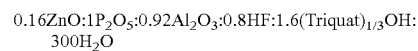

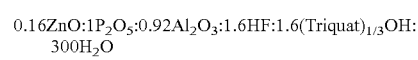

The following procedure was used for the syntheses, which was found to be sensitive to mixing times. The Triquat-SDA hydroxide was mixed with zinc(II)acetate and aluminum isopropoxide and stirred for 1 hour in a covered vessel. Phosphoric acid was then added to the gel, and it was stirred while covered for 15 minutes. Finally the gel was transferred to a Teflon Parr Reactor, and the HF was added directly to the reactor. The reactor was sealed and manually shaken for several minutes to ensure good mixing of the reagents. The reactor was placed in either a static or rotating oven between 160 and 180° C. (no differences in the product were found in this operating range). It was important to not allow time for the isopropanol produced from the hydrolysis of the aluminum isopropoxide to evaporate, the exact cause of this is not known, but is likely a complex interaction of aging time and initial pH.

Figure 11:
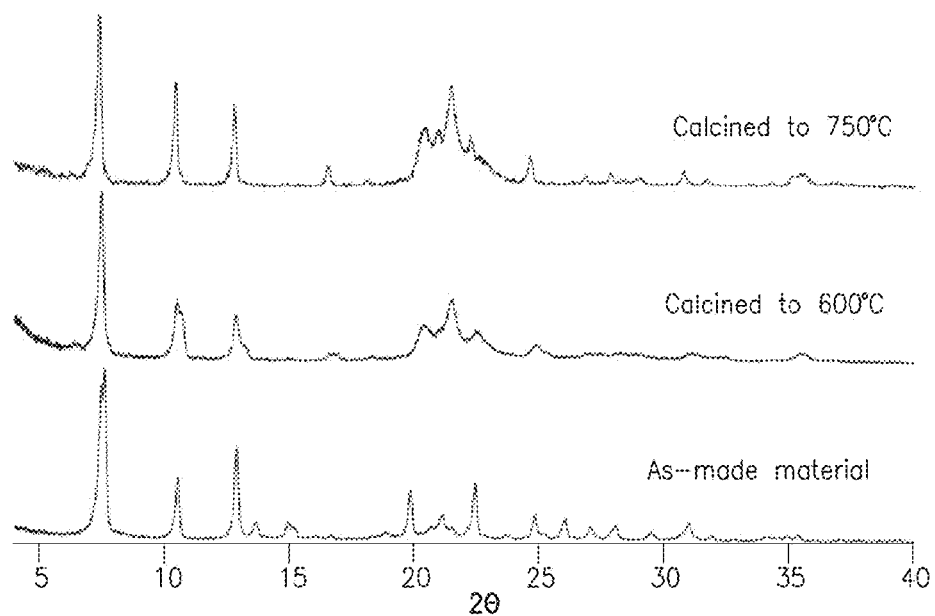
FIG. 11 illustrates the XRD patterns of as-made and calcined ZnAPO-LTA, according to an embodiment of the present disclosure.
Figure 12:
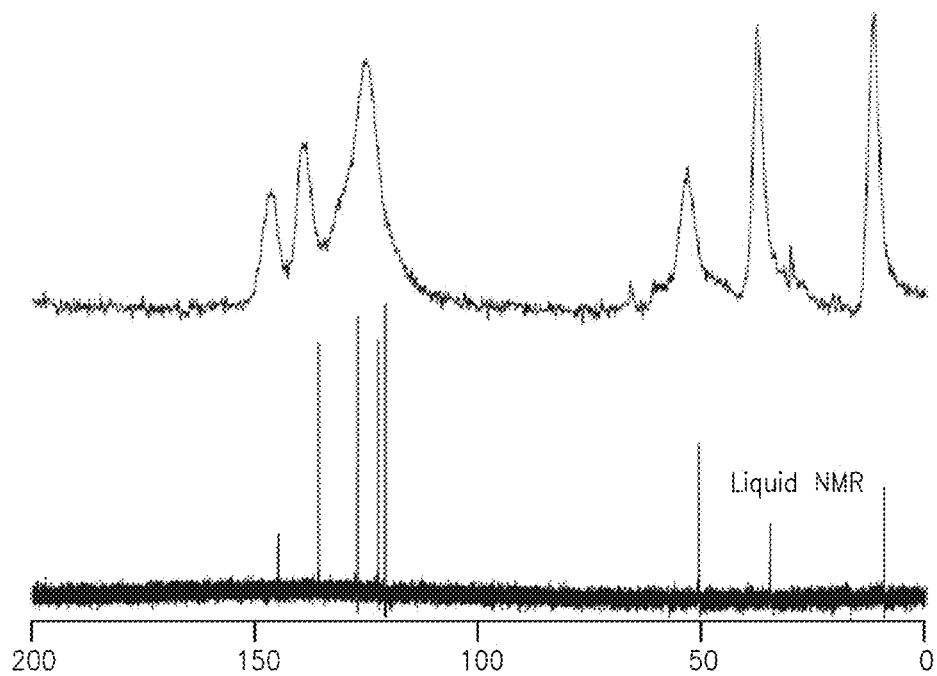
FIG. 12 illustrates the 13C-CPMAS NMR of ZnAPO made with Triquat-SDA compared with Triquat-SDA liquid NMR, according to an embodiment of the present disclosure.

The ZnAPO produced with Triquat-SDA is somewhat stable to calcination, as shown in FIG. 11. While the first three major peaks remain after calcination, many of the other peaks in the XRD decrease in intensity. One possibility is that calcination causes some framework degradation of the material, this will be discussed further for the following materials but based on the XRD some of the material has likely turned into the dense phase tridymite. Energy-dispersive X-ray spectroscopy (EDS) was used to determine if zinc was in the material and it showed a small molar percentage of zinc, consistent with the synthesis gel composition. As shown in FIG. 12, $^{13}$C-CPMAS NMR shows that Triquat-SDA was occluded inside the pores of the material. The porosity of the material was also examined using nitrogen adsorption to determine if the material was microporous.

Figure 13:
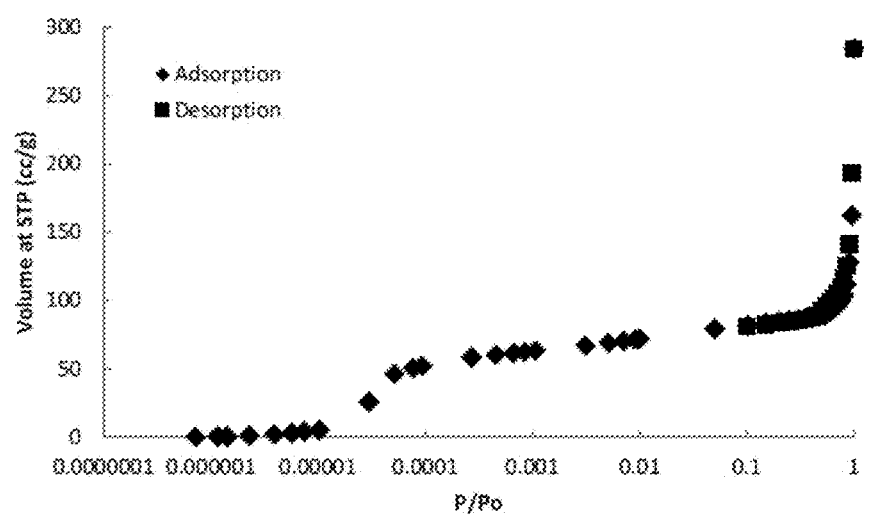
FIG. 13 illustrates the log scale nitrogen isotherm of ZnAPO, according to an embodiment of the present disclosure.

The isotherm plotted on a log scale for $P/P_0$ is in FIG. 13 and shows behavior characteristic of a microporous material. The micropore volume was determined to be 0.112 cm$^3$/g for the material. The TGA of the material showed an organic loss of 22.3%. The catalytic activity of the material for the methanol to olefins reaction was also evaluated. The material showed ~80% conversion of the methanol with nearly complete selectivity to dimethyl ether. It is believed that the material is of LTA framework topology; this will be discussed further for the subsequent materials.

Examples 5: Synthesis and Characterization of Transition Metal Aluminophosphates A variety of transition metals were also incorporated into the LTA structure using Triquat-SDA. Transition metals such as cobalt, copper, iron, magnesium, manganese, nickel, and zinc were incorporated into the LTA structure using by adding transition metal acetates (Me(II)acetates) to the reaction mixture.

Figure 14:
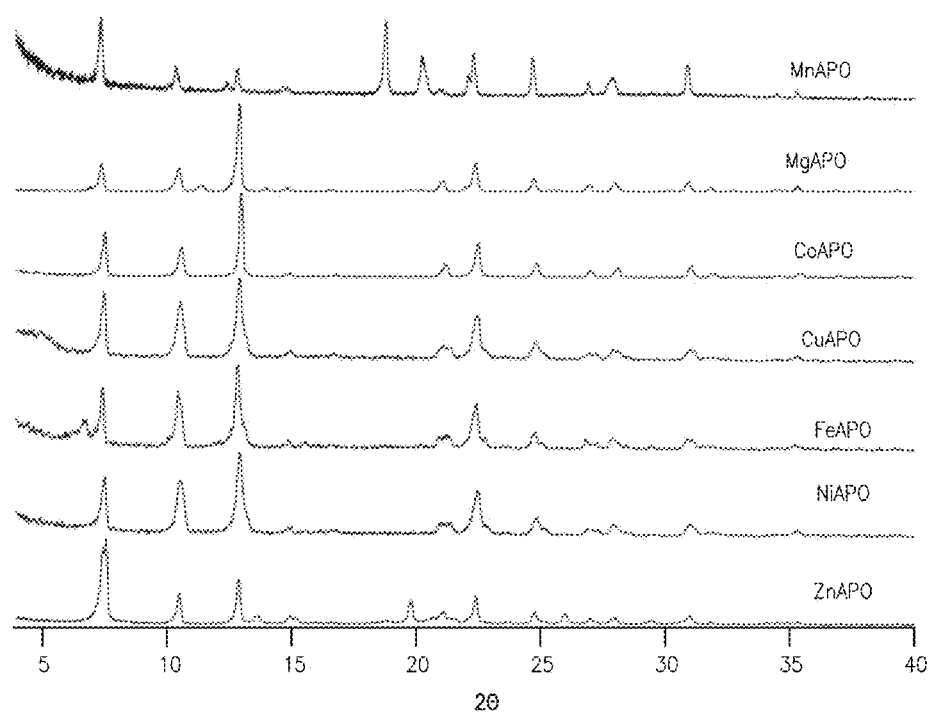
FIG. 14 illustrates the XRD patterns of MnAPO, MgAPO, CoAPO, CuAPO, FeAPO, NiAPO, and ZnAPO, according to an embodiment of the present disclosure.

Since it was possible to synthesize a microporous material, believed to be LTA, with an AlPO$_4$, SAPO and ZnAPO composition using Triquat-SDA, the same synthesis protocol was then extended to other transition metals. As a reliable synthesis procedure has been developed for zinc(II) acetate, other Me(II)acetates were tried in analogous synthesis procedures. Additional metals used are: cobalt, copper, iron, magnesium, manganese and nickel. All of the materials produced crystalline products and all the XRD traces of the products are in FIG. 14. Complete characterization of the materials is underway and current progress can be found in the Appendix. However, it appears that some of these materials are also can be of LTA framework topology.

Example 6: Synthesis and Characterization of Germanosilicates

There are two known methods to make germanosilicate LTA, and only a single reported method to produce pure-silica LTA (ITQ-29). Germanosilicate LTA has been prepared using the cyclic crown ether Kryptofix 222 (II), which is also known to produce aluminophosphate LTA It was reasoned that this Triquat-SDA led to aluminophosphate LTA because its large, space-filling nature is able to fill the α-cage of LTA. Methylated julolidine (III) is able to produce germanosilicate LTA as well as pure-silica LTA. See A. Corma, F. Rey, J. Rius, M. J. Sabater, S. Valencia, Supramolecular self-assembled molecules as organic directing agent for synthesis of zeolites, Nature. 431 (2004) 287-90. doi:10.1038/nature02909.

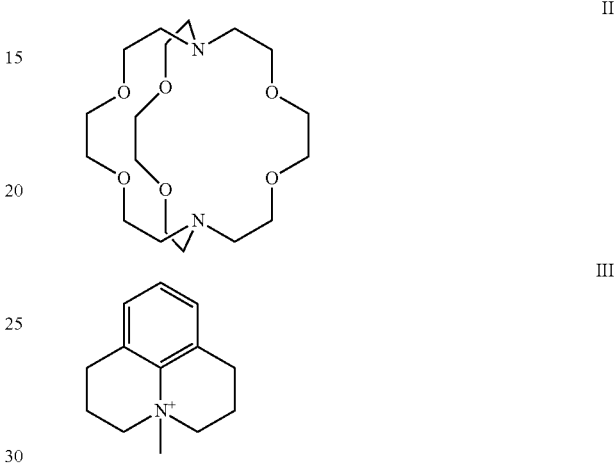

Methylated julolidine was first reported to form pure-silica LTA in combination with tetramethylammonium hydroxide (TMAOH). It was determined that the julolidine led to ITQ-29 by forming a supramolecular assembly of two molecules per α-cage. TMAOH was necessary in these syntheses as it promotes the formation of sodalite cages and compensates charge from the fluoride anions. Fluoride is known to reside in double four rings (D4Rs, LTA has 6 independent D4Rs per unit cell), so four additional TMAOH molecules per unit cell are necessary if all D4RS are occupied with fluoride (the julolidine will compensate for two charges). ITQ-29 will only form at very low amounts of water (H$_2$O/SiO$_2$=2), and often, AST will form instead as a competing phase. Germanosilicate LTA crystallizes more readily than pure-silica LTA, and TMAOH is not necessary in its synthesis. It is likely that germanium promotes the formation of LTA, as it is known to favor the formation of D4Rs, and all T-atoms in LTA are in D4Rs.

Adding germanium to molecular sieve syntheses has been found to promote the formation of double 4-rings (D4R) in the structure. A simple way to understand this is by considering mean bond angles. A structural analysis of many silica molecular sieves found that the average Si—O—Si bond angle was 154±9° but for Ge—O—Ge bonds the angle has been found to be closer to 130°. It is believed that this smaller bond angle helps the formation of the 90° angle found in D4R building units and this has been confirmed by theoretical calculations. This building unit is desirable to obtain extra-large-pore zeolites and germanium has been used to synthesize many new frameworks.

Germanosilicate Synthesis. Tetraethylorthosilicate (TEOS) and germanium ethoxide were added to Triquat-SDA in its hydroxide form. The container was closed and stirred overnight to allow for complete hydrolysis. The lid was then removed, and the ethanol and appropriate amount of water were allowed to evaporate under a stream of air.

Once the appropriate mass was reached, the material was transferred to a Teflon Parr Reactor and aqueous HF was added. The mixture was stirred by hand until a homogenous gel was obtained. The autoclave was sealed and placed in a rotating oven at temperatures ranging from 140° C. to 175° C. Aliquots of the material were taken periodically by first quenching the reactor in water and then removing enough material for powder x-ray diffraction (XRD).

Based on this method, a gel with the following composition was prepared.

$$0.67SiO_2:0.33GeO_2:0.50(Triquat)_{1/3}OH: 0.167TMAOH:0.667HF:7H2O$$

Figure 15:
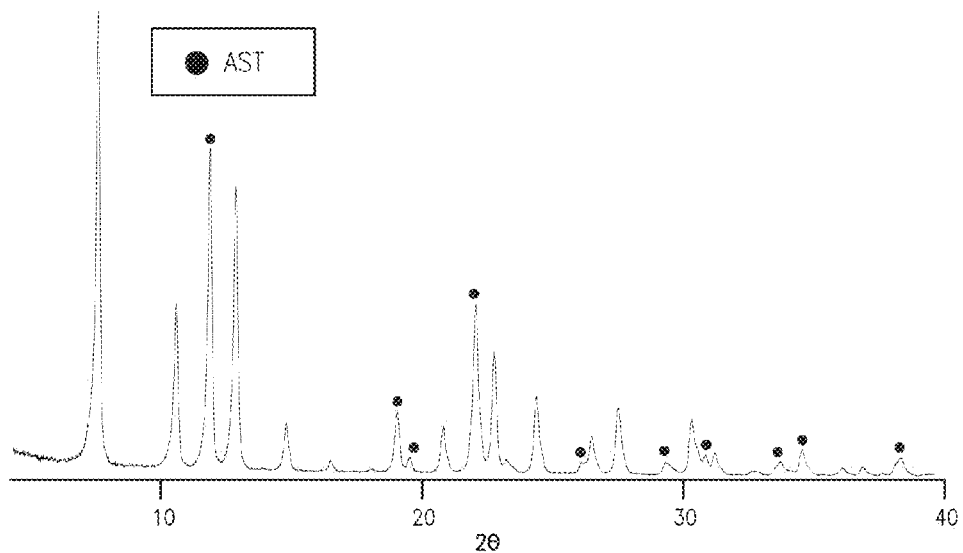
FIG. 15 illustrates the XRD patterns of a germanosilicate LTA/AST mixture with AST marked with (*), according to an embodiment of the present disclosure.

After 2 days at 160° C. rotating a crystalline product was obtained and the XRD is shown in FIG. 15. The product is a mixture of LTA and octadecasil (AST). The octadecasil (AST) topology has also been defined by the Structure Commission of the International Zeolite Association, Complete information on the structure and properties of the Octadecasil (AST) topology can be found at the www page iza-structure.org/databases, the entire content of which is incorporated herein by reference.

Figure 16:
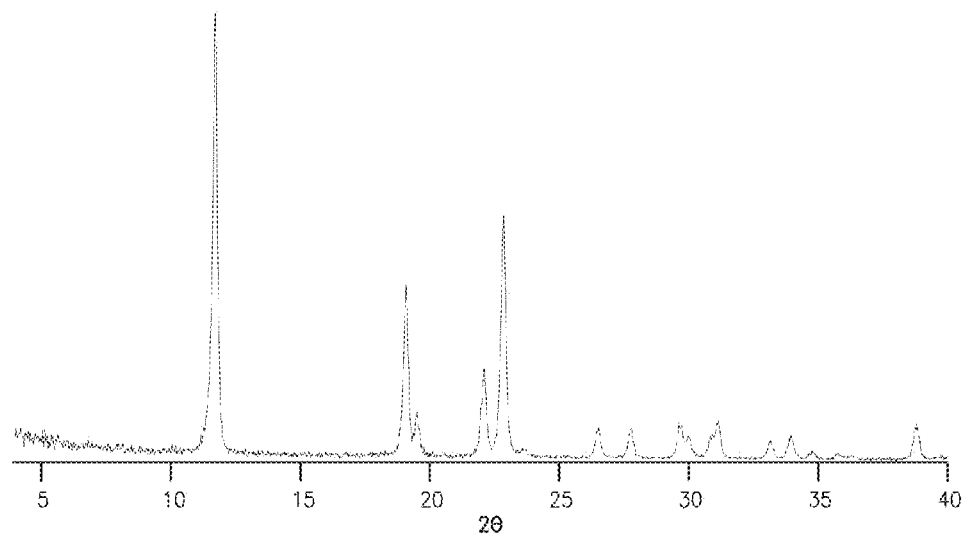
FIG. 16 illustrates XRD patterns of octadecasil.
Figure 17:
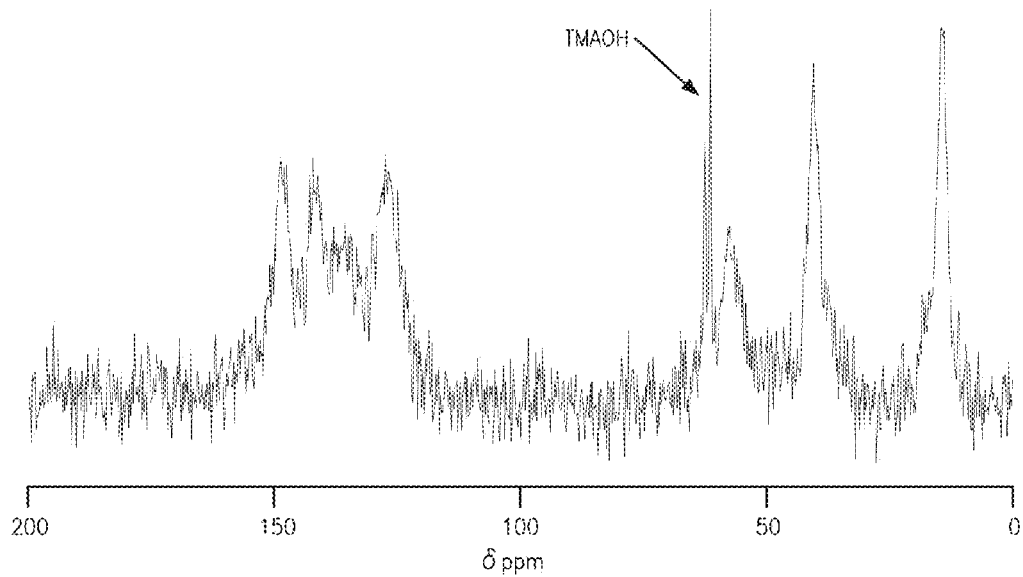
FIG. 17 illustrates the $^{13}C$ CPMAS NMR of the germanosilicate LTA/AST mixture, according to an embodiment of the present disclosure.
Figure 18:
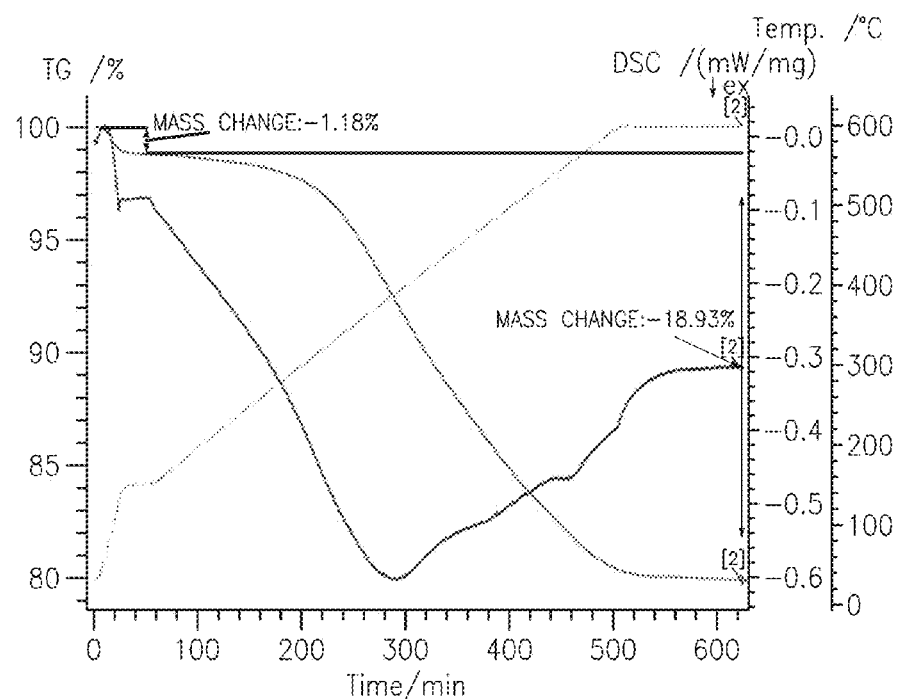
FIG. 18 illustrates the TGA of germanosilicate LTA/AST mixture, according to an embodiment of the present disclosure.

In FIG. 15, the peaks identified as AST are denoted with an asterisk. A XRD of a representative octadecasil product is in FIG. 16. The 13C CPMAS NMR, as shown in FIG. 17, confirms that both Triquat-SDA and TMAOH are occluded in the product. Additionally the TGA, as shown in FIG. 18, shows an organic loss of 18%.

Figure 19:
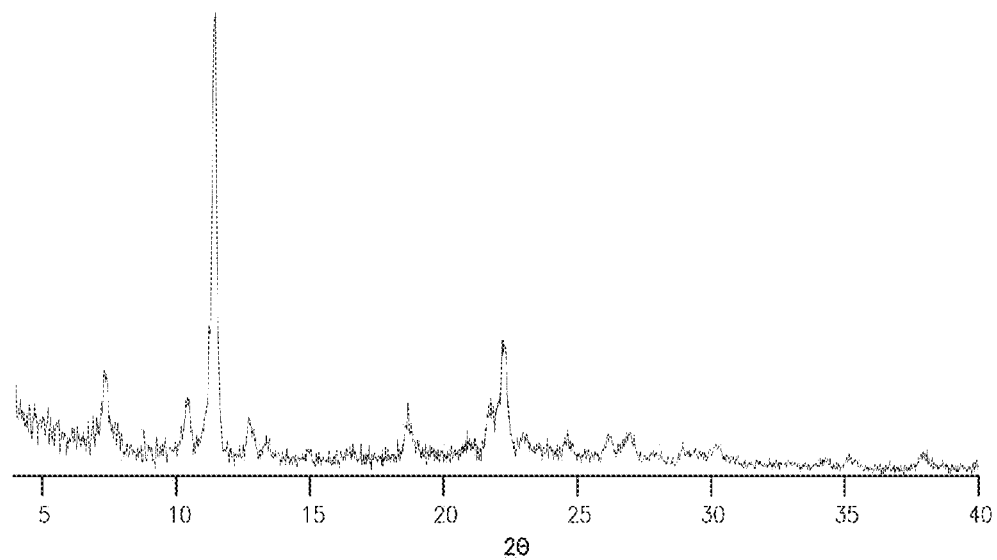
FIG. 19 illustrates the XRD patterns of germanosilicate LTA/AST after calcination to 600° C., according to an embodiment of the present disclosure.
Figure 20:
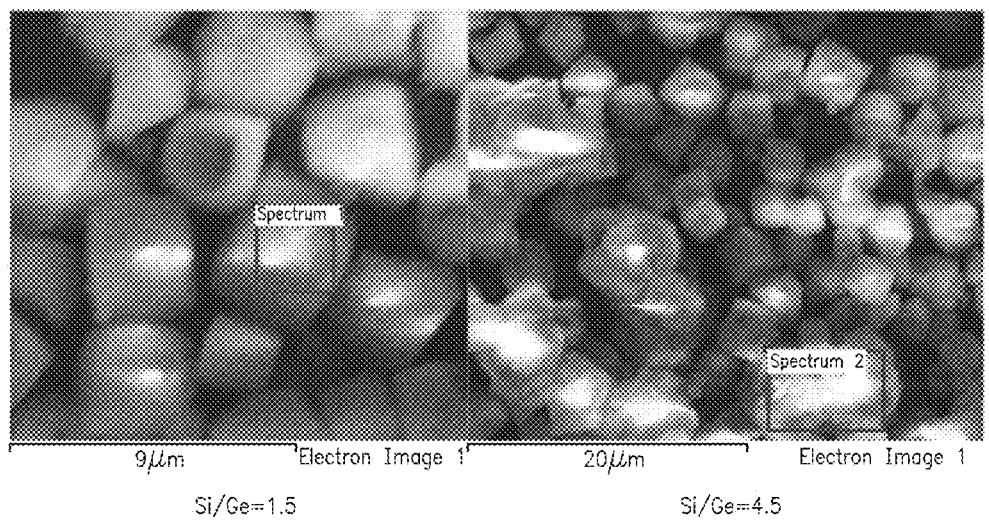
FIG. 20 illustrates the SEM images of germanosilicate LTA with areas selected for EDS.

All the results from this sample are consistent with the mixture of phases. It is likely that the addition of TMAOH led to the formation of sodalite cages which in turn were incorporated into LTA but also formed octadecasil as an impurity. The $^{13}C$ NMR shows two resonances for TMAOH which can result from the different chemical environments for TMAOH in LTA and AST. Additionally, the TGA shows several distinct stages of mass loss, evident from the DSC trace. The lower temperature loss can be attributed to Triquat, in the larger alpha cages, and the higher temperature DSC spikes can be attributed to TMAOH in the sodalite cages. After calcination to 600° C. the sample exhibited loss of crystallinity, evident from XRD, as shown in FIG. 19. The loss of crystallinity can be attributed to the high germanium content of the sample which generally leads to less stable materials.

The first germanosilicate in this work which produced a phase mixture of LTA and AST with Triquat intact established that Triquat could act as an SDA for germanosilicate (and by extension possibly pure silica) LTA. To produce a phase pure sample of LTA the gel composition was modified to reduce the amount of TMAOH to prevent the formation of AST. The molar ratios used along with the product phase are shown in Table 1.

TABLE 1

| Molar Ratios and Results in Germanosilicate Systems | |
|---|---|
| Composition | Product |
| 0.67SiO$_2$:0.33GeO$_2$:0.50(Triquat)$_{1/3}$OH: 0.167TMAOH:0.667HF:7H$_2$O | LTA/AST |
| 0.67SiO$_2$:0.33GeO$_2$:0.50(Triquat)$_{1/3}$OH: 0.1TMAOH:0.6HF:7H$_2$O | LTA/AST |
| 0.67SiO$_2$:0.33GeO$_2$:0.50(Triquat)$_{1/3}$OH: 0.05TMAOH:0.55HF:7H$_2$O | LTA/AST |
| 0.67SiO$_2$:0.33GeO$_2$:0.50(Triquat)$_{1/3}$OH: 0.01TMAOH:0.51HF:7H$_2$O | LTA |
| 0.8SiO$_2$:0.2GeO$_2$:0.50(Triquat)$_{1/3}$OH: 0.1TMAOH:0.6HF:7H$_2$O | LTA/AST |

TABLE 1-continued

| Molar Ratios and Results in Germanosilicate Systems | |
|---|---|
| Composition | Product |
| 0.9SiO$_2$:0.1GeO$_2$:0.50(Triquat)$_{1/3}$OH: 0.1TMAOH:0.6HF:7H$_2$O | LTA/AST |

Figure 21:
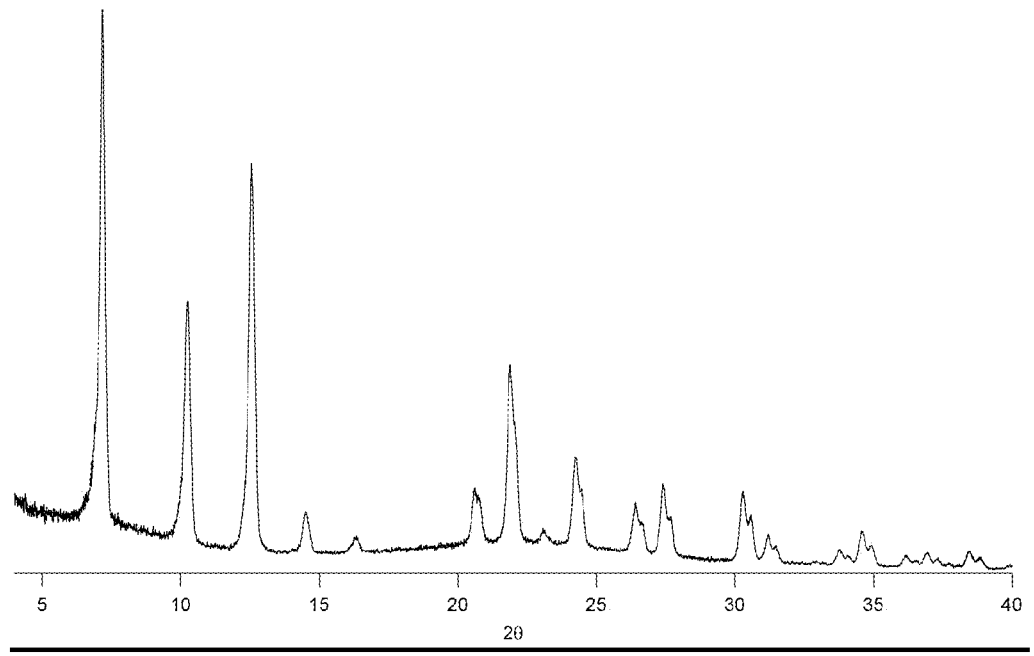
FIG. 21 illustrates an XRD of germanosilicate LTA, according to an embodiment herein described.
Figure 22:
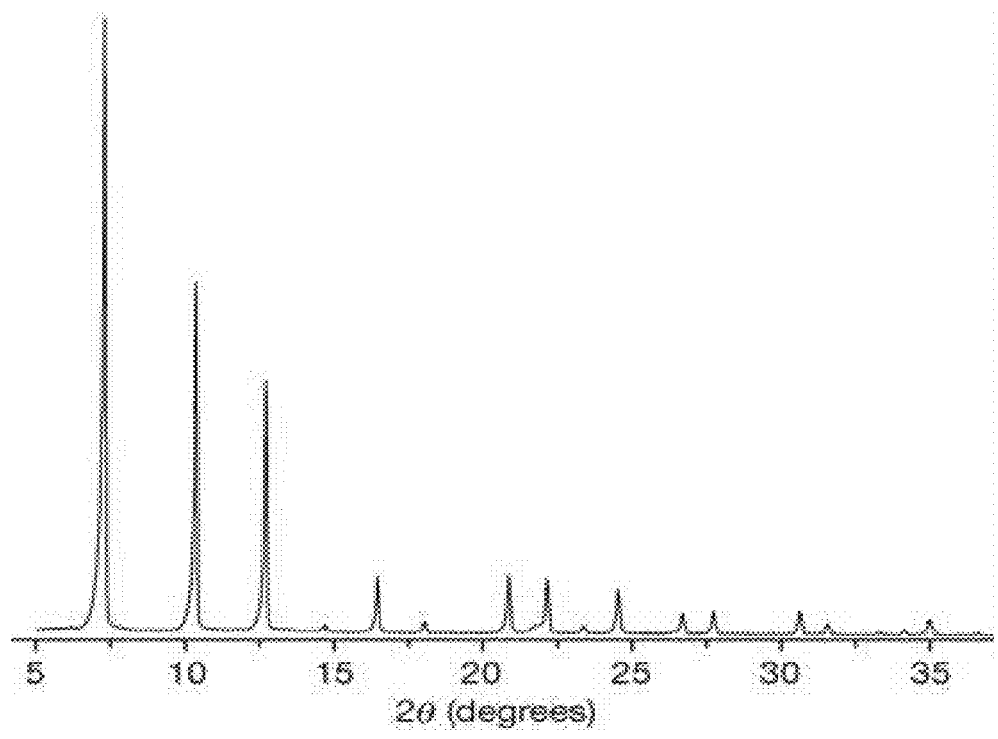
FIG. 22 illustrates an XRD of germanosilicate LTA, as published in Corma, A.; Rey, F.; Rius, J.; Sabater, M. J.; Valencia, S. Supramolecular self-assembled molecules as organic directing agent for synthesis of zeolites. *Nature* 2004, 431, 287-290.

These samples establish that lowering the amount of TMAOH to nearly a "catalytic" amount can nearly eliminate the formation of octadecasil. The term catalytic is used since these molar ratios could not lead to a filling of all a and sodalite cages with organic in the LTA. A XRD of the germanosilicate is shown in FIG. 21 and the XRD of the germanosilicate LTA produced by Corma et al. is shown in FIG. 22. All of the observed peaks agreed with those reported by Corma, however the baseline indicates that the sample is still somewhat amorphous. Additionally, although not well resolved, it appears there is a doubling of some of the higher angle peaks which was not seen the in the sample of Corma et al.

Figure 23:
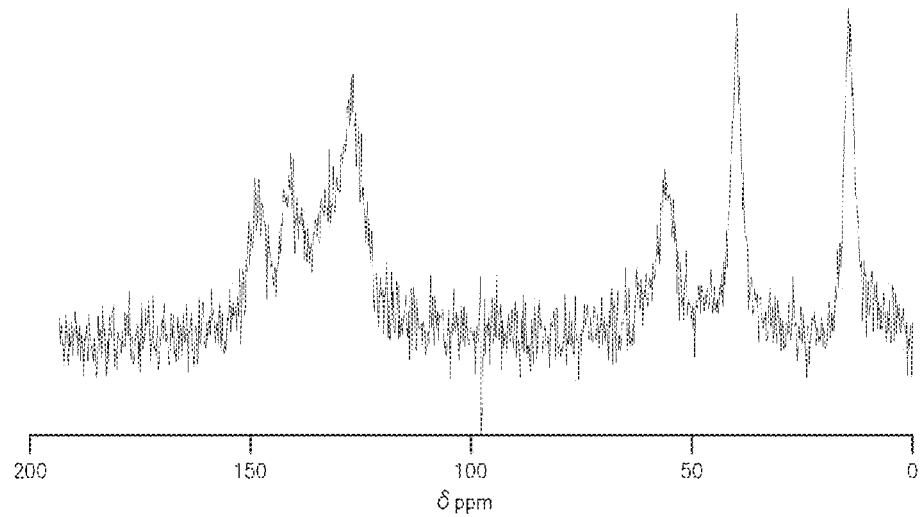
FIG. 23 illustrates the $^{13}C$ CPMAS NMR of germanosilicate LTA, according to an embodiment of the present disclosure.
Figure 24:
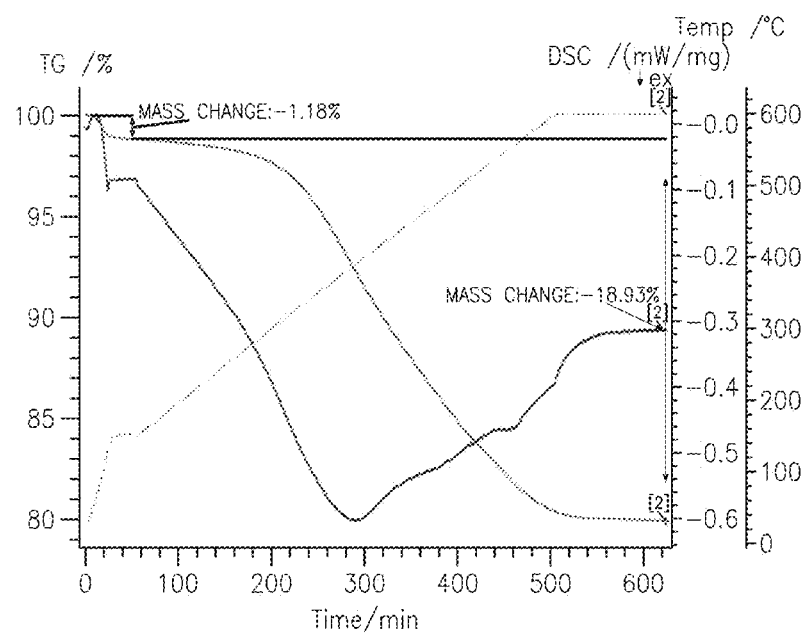
FIG. 24 illustrates the TGA of germanosilicate LTA, according to an embodiment of the present disclosure.

The $^{13}C$ NMR of the germanosilicate LTA, shown in FIG. 23 shows that Triquat is occluded in the material. It does not show any resonances for TMAOH, however, due to the small amount present in the synthesis gel, it is possible that any TMAOH occluded in the product is lost in the noise of the spectrum. The TGA, shown in FIG. 24, shows one main mass loss and two smaller high temperature mass losses evident from the DSC. It is possible that these spikes in the DSC are due to the combustion of the small amount of TMAOH in the sample as was suggested for the LTA/AST phase mixture.

Figure 25:
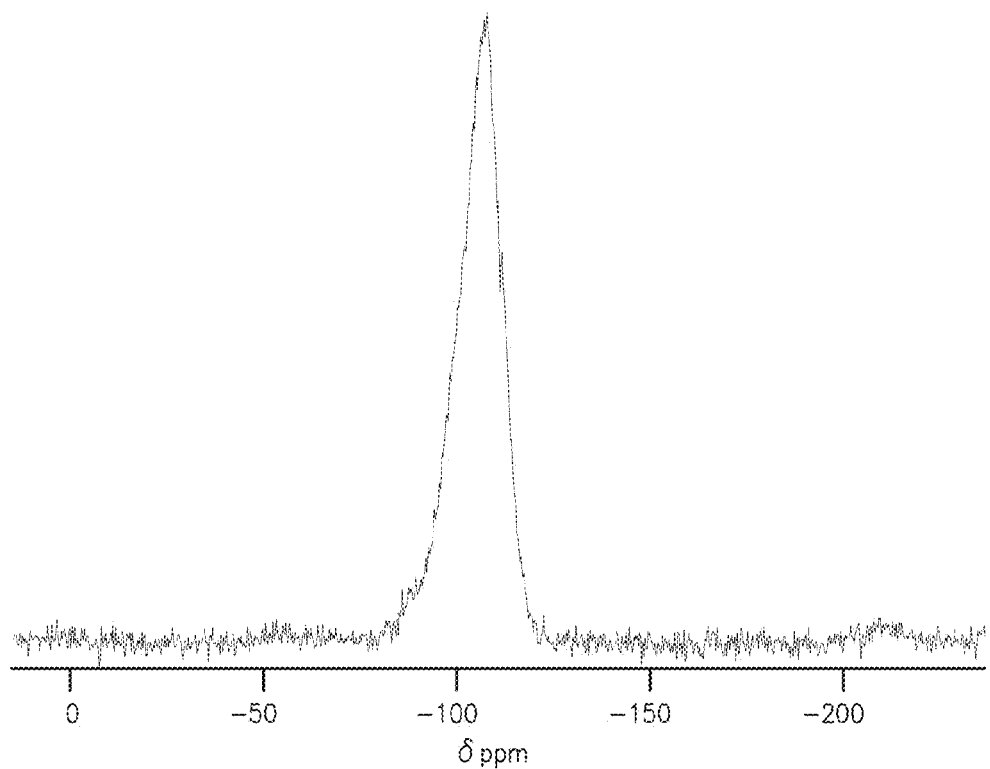
FIG. 25 illustrates the $^{29}Si$ CPMAS NMR of germanosilicate LTA, according to an embodiment of the present disclosure.
Figure 26:
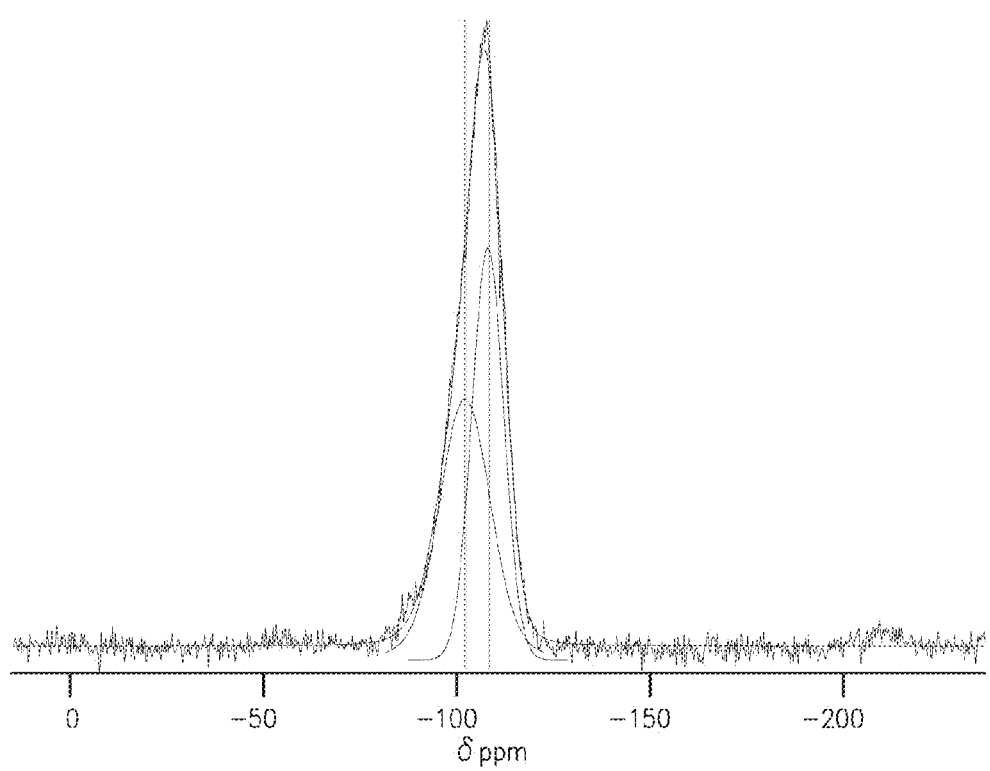
FIG. 26 illustrates the deconvoluted $^{29}Si$ CPMAS NMR of germanosilicate LTA showing peaks at −102 and −108 ppm, according to an embodiment of the present disclosure.
Figure 27:
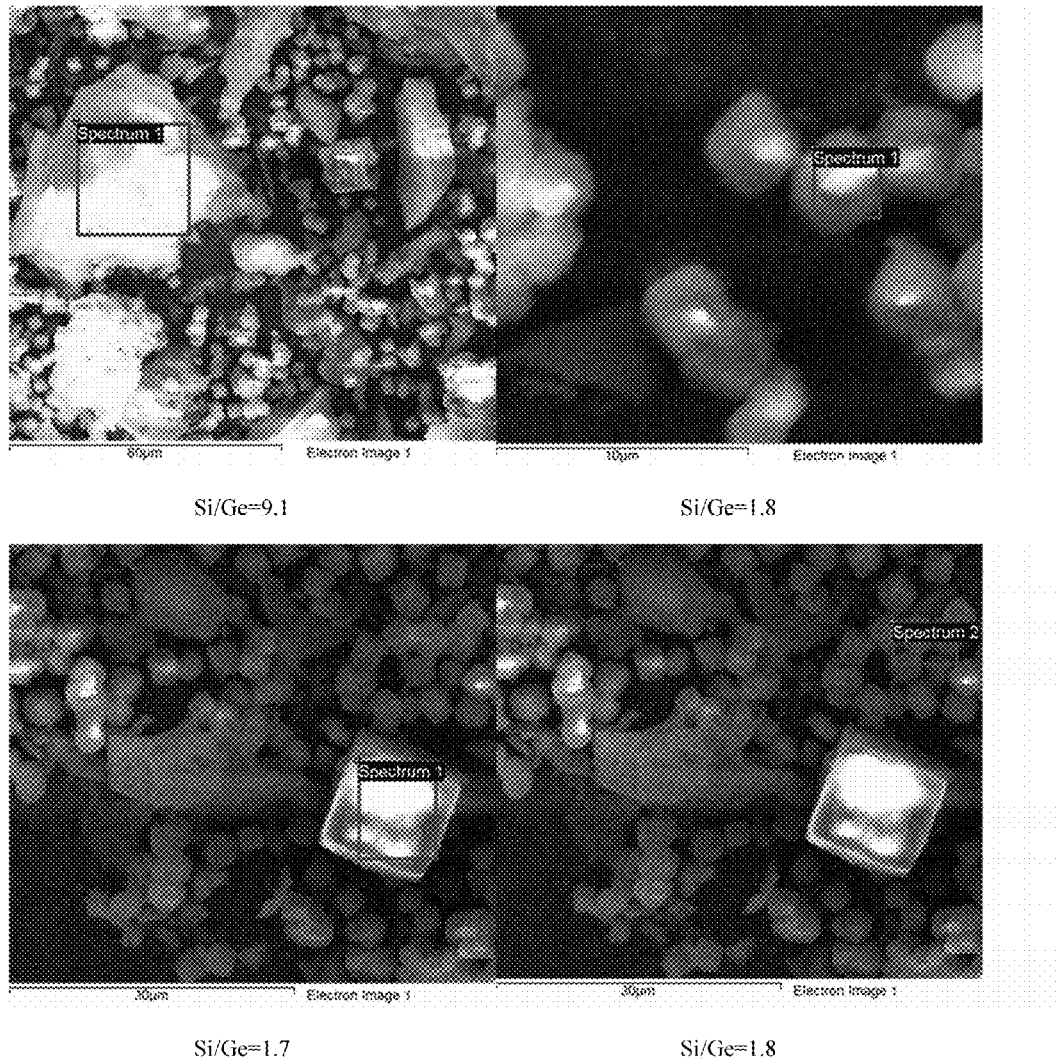
FIG. 27 illustrates the SEM image germanosilicate LTA with Si/Ge=2 in gel, according to an embodiment of the present disclosure.

The germanosilicate LTA was further characterized by $^{29}Si$ CPMAS NMR which is shown in FIG. 25 and the deconvolution of the spectrum shown in FIG. 26. The main peak is located at −108 ppm which is consistent with Si(OSi)$_4$ coordination. Additionally, there is another resonance at −102 ppm which can be attributed to silica coordinated to germanium atoms.

SEM/EDS was also used to visually characterize the morphology of the material as well as the Si/Ge ratio. In the sample cubic symmetry was visually observed along with what appears to be amorphous material. The regions with cubic symmetry had Si/Ge=1.7-1.9 while the regions which appeared to be amorphous had Si/Ge=9.1. Also, the large crystals in the sample mean it can be possible to obtain a single crystal analysis in the future.

In order to hopefully increase the thermal stability of the product the Si/Ge ratio was increased in the synthesis gel to the following molar ratios.

$$0.9SiO_2:0.1GeO_2:0.50(Triquat)_{1/3}OH:0.1TMAOH: 0.6HF:7H_2O$$

Figure 28:
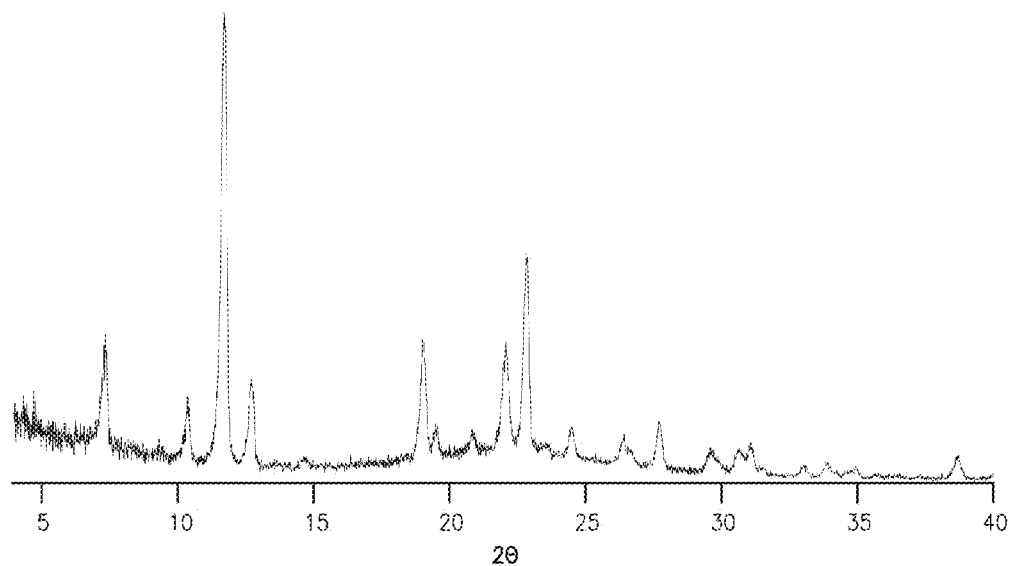
FIG. 28 illustrates the XRD of germanosilicate LTA/AST with Si/Ge=9, according to an embodiment of the present disclosure.
Figure 29:
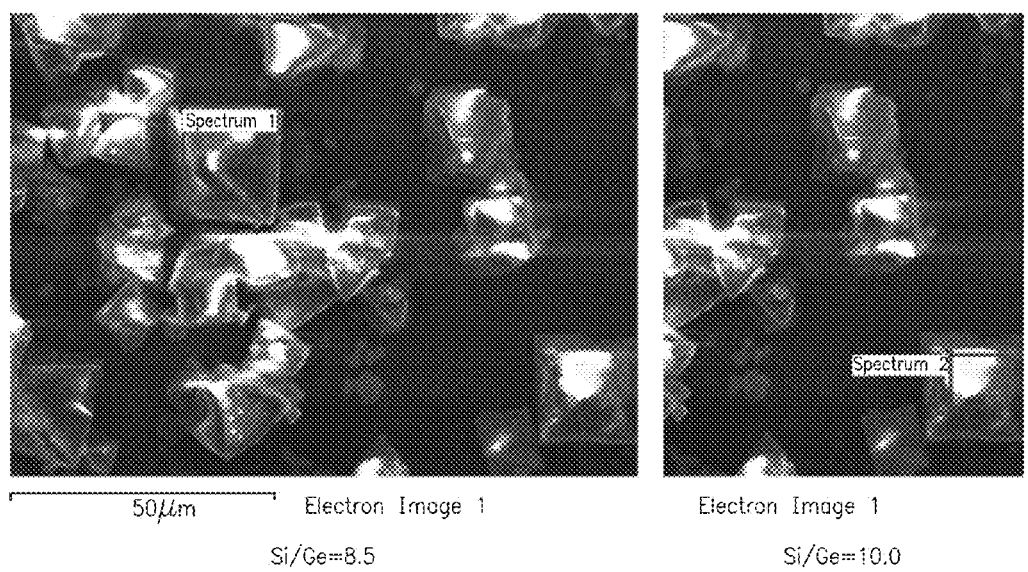
FIG. 29 illustrates the SEM/EDS of germanosilicate LTA/AST with Si/Ge=9 in gel according to an embodiment of the present disclosure.

FIG. 28 shows the XRD of a mixture of LTA and AST and, based on comparisons to other patterns, it is likely there is a large amount of octadecasil present. FIG. 29 shows the SEM images of a majority of the material with an octahedral morphology and only a small amount with what appears to be a cubic morphology.

Several conclusions about various synthesis elements to favor the formation of LTA over AST can be obtained from these initial experiments. The first is that only a catalytic amount of TMAOH is necessary to induce the formation of LTA. Without a small amount of TMAOH, ITQ-24 will form. As ITQ-24 does not contain sodalite cages, it is likely that this small amount of TMAOH structure directs towards the formation of the sodalite building unit which directs the product to form LTA instead of ITQ-24. However, if more TMAOH is added to the synthesis a mixed phase of LTA and AST forms, likely due to the overproduction of the sodalite building unit which can lead to a competition between the formation of LTA and AST.

Figure 36:
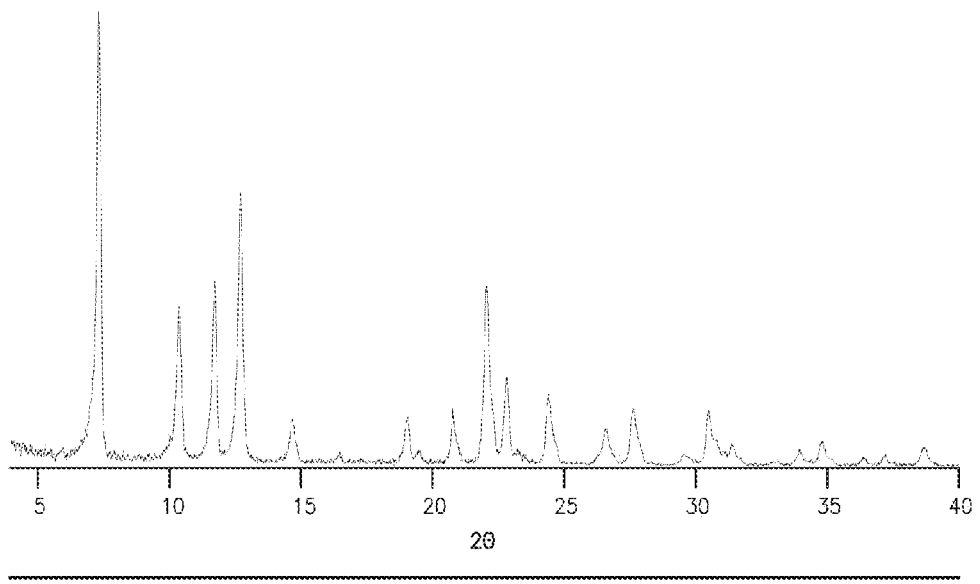
FIG. 36 illustrates the XRD traces of as-made and calcined SAPO made with Triquat, according to an embodiment of the present disclosure.

The Si/Ge of the synthesis gel also appears to influence the distribution of phases in the final product. While the XRD does not give quantization of the relative amounts of LTA and AST in the final product, with the same amount of TMAOH and Triquat-SDA in the gel a lower Si/Ge seems to favor LTA over AST by comparing FIG. 28 (Si/Ge=9) and FIG. 36 (Si/Ge=2). This observation aligns with the EDS analysis of the products. In the LTA rich products the Si/Ge ranged from 1.5-2 but these materials also contained amorphous regions rich in silica, which likely absorbed the balance silica as these gels were Si/Ge=2. However, the octadecasil rich products had much higher Si/Ge ratios which supports the theory that the LTA preferentially contains the germanium while the AST more readily takes up silica. This evidence indicates that the germanium is preferentially taken into the LTA framework and can make synthesis of pure silica LTA difficult or require longer synthesis times as this work has only explored synthesis times up to 4 days.

Figure 30:
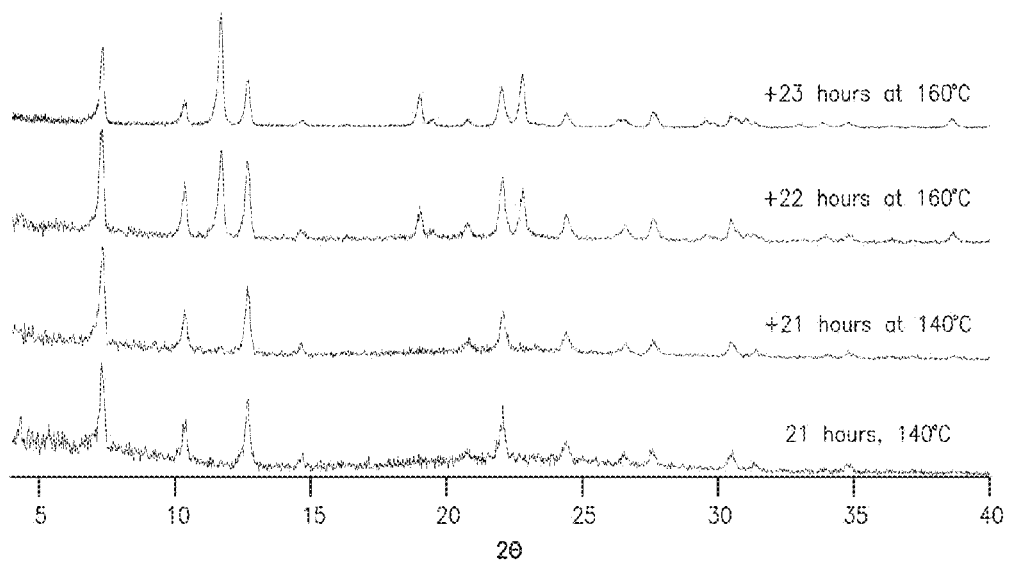
FIG. 30 illustrates germanosilicate LTA/AST time/temperature traces with gel Si/Ge=4 wherein AST is indicated with (*), according to an embodiment of the present disclosure

The final vital synthesis variable is the reaction temperature. Experimental evidence indicates that LTA is favored at 140° C. while at 160° C. the formation of octadecasil is more pronounced. This competition was observed in the Si/Ge=4 material which was started at 140° C. and then moved to 160° C., as shown in FIG. 30. As the XRD patterns show, the octadecasil phase is just at the detection limit of the XRD at 140° C. but once the material was moved to 160° C. emerges as a major product. This evidence indicates that the material should be run at 140° C. for longer times to favor LTA.

Figure 31:
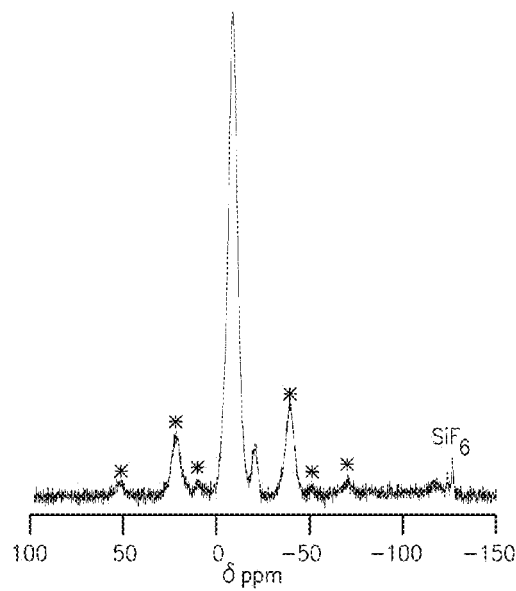
FIG. 31 illustrates $^{19}F$ NMR of germanosilicate LTA, wherein (*) denotes spinning side bands, according to an embodiment of the present disclosure

The fluoride environment in the germanosilicate LTA was measured using $^{19}F$ NMR, and is shown in FIG. 31. The spectrum is consistent with the expected position of fluoride occluded in double four rings with different amounts of silicon and germanium present (leading to different environments).

From the results of $AlPO_4$/SAPO/MeAPO syntheses, it is known that Triquat is capable of serving as the SDA in the LTA framework. Therefore, several approaches to encourage the formation of LTA were explored based on the LTA framework which is comprised of double four rings (D4Rs), sodalite cages and larger a cages. Based on the size of Triquat, it was believed that it resides inside the a cages of $AlPO_4$/SAPO/MeAPO LTA. In order to promote the formation of LTA additional inorganic and organic elements were used and have been detailed in this disclosure

Example 7: Synthesis and Characterization of Pure Silica Molecular Sieves

The germanosilicate results in Example 6 showed that the Si/Ge ratio can be increased by increasing the gel Si/Ge ratio, however, they appear to reach a maximum of Si/Ge<5. See Table 2, entries 3-5. This limitation made it impossible to synthesize a high-silica germanosilicate (in order to increase the material's stability or remove the germanium after the synthesis and heal the defects using methods reported with other germanosilicate systems). The first trials to produce pure-silica LTA incorporated TMAOH into the reaction mixture, as was done with ITQ-29, to promote the formation of sodalite cages and compensate charge from the fluoride. These syntheses were conducted with $H_2O/SiO_2$=2-14 and at a variety of temperatures, in all cases, AST was the only product formed, as shown in Table 2, entry 6. When the TMAOH was eliminated from the reaction, no product was observed, despite adding germanosilicate LTA seeds and running the reactions for over 2 months in some cases Table 2, entry 7. A large range of compositions and temperatures were explored, but the only crystalline product produced was ITQ-24 in one instance, as shown in Table 2, entry 8.

TABLE 2

Results in germanosilicate and pure-silica systems

| | Molar Ratios | | | | | | | | | Gel | Product |
|---|---|---|---|---|---|---|---|---|---|---|---|
| Entry | Si | Ge | Al | $R_{1/3}OH$ | TMAOH | HF | $H_2O$ | Temp. | Seeds | Product | Si/Ge | Si/Ge |
| 1 | 0.67 | 0.33 | | 0.25 | 0.25 | 0.50 | 2-7 | 140° C. | | AST + LTA | 2 | |
| 2 | 0.67 | 0.33 | | 0.50 | 0.01 | 0.51 | 2-7 | 140° C. | | LTA | 2 | |
| 3 | 0.67 | 0.33 | | 0.50 | | 0.51 | 2-7 | 140° C. | Yes | LTA | 2 | 2.1 |
| 4 | 0.9 | 0.1 | | 0.50 | | 0.50 | 7 | 140° C. | Yes | Small LTA | 9 | Crystals 4.7 |
| 5 | 0.95 | 0.05 | | 0.50 | | 0.50 | 7 | 140° C. | Yes | Small LTA | 19 | Crystals 4.4 |
| 6 | 1 | | | 0.50 | 0.01-0.25 | 0.50 | 2-14 | 140° C. | Yes | AST | ∞ | |
| 7 | 1 | | | 0.50 | | 0.50 | 2-14 | 140-160° C. | Yes | Amph. | ∞ | |
| 8 | 1 | | | 0.50 | | 0.50 | 7 | 175° C. | Yes | ITQ-24 | ∞ | |
| 9 | 0.67 | 0.33 | | 0.50 | | 0.50 | 2-14 | 175° C. | | ITQ-24 | 2 | |

Pure silica-LTA molecular sieves were synthesized using the same method used for the synthesis of germanosilicate molecular sieves. Tetramethylammonium was added to pure silica syntheses with Triquat in a variety of conditions shown in Table 3, yielding the indicated products.

TABLE 3

Pure silica molecular sieves

| Entry | Composition | Temperature | Time | Product |
|---|---|---|---|---|
| 1 | $1SiO_2$:$0.5(Triquat)_{1/3}OH$: $0.5HF$:$7H_2O$ | 140° C. | 4 months | LTA |
| 2 | $1SiO_2$:$0.5(Triquat)_{1/3}OH$: $0.5HF$:$0.1NaF$:$4H_2O$ | 140° C. | 12 days | LTA |

Figure 32:
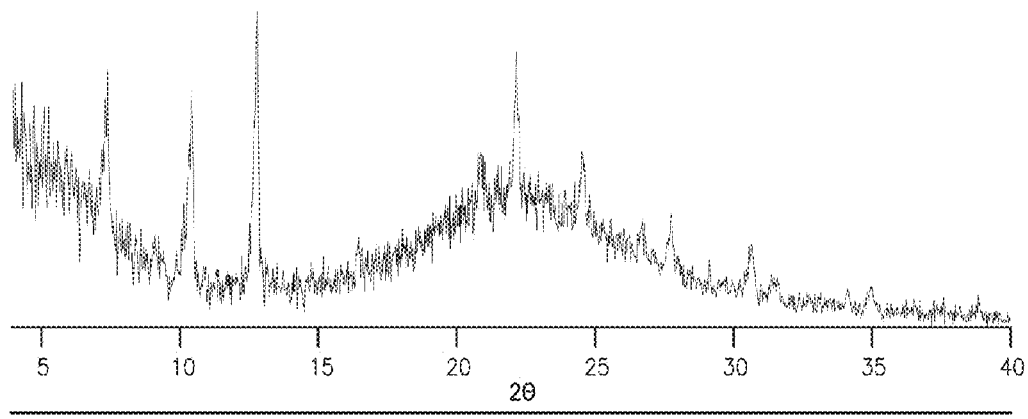
FIG. 32 illustrates the XRD of pure silica LTA, according to an embodiment of the present disclosure.
Figure 33:
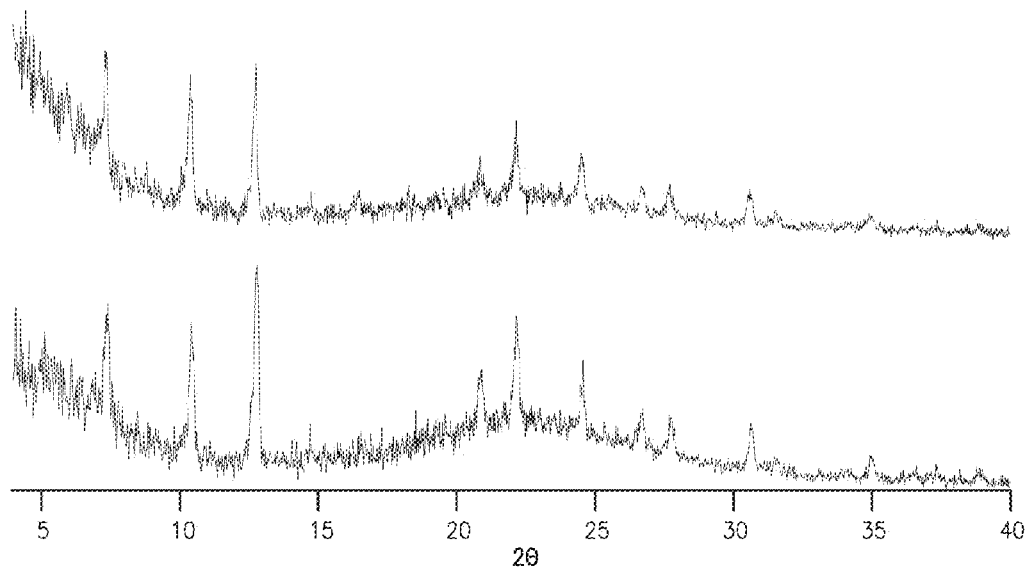
FIG. 33 illustrates the XRD of pure silica LTA synthesized using sodium fluoride, according to an embodiment of the present disclosure.

FIG. 32 shows powder XRD of as-made pure silica LTA. This particular sample was heated at 140° C. for 4 months in the ratios shown in Table 3, entry 1. FIG. 33 shows the powder XRD of pure silica LTA synthesized using a modified procedure. Sodium Fluoride was added to the reaction mixture prior to heating for 12 days (Table 3, entry 2). The lower trace of FIG. 33 shows the XRD of the as-made material, while the upper trace shows a spectrum taken after organic compounds were removed from the material using ozone at 150° C.

In summary, in several embodiments, methods for preparing molecular sieves and molecular sieves obtained thereby are described. In particular a method for preparing molecular sieves with a Linde Type A (LTA) topology and molecular sieves obtained thereby are described are described wherein in the method a structure directing agent comprising a triquaternary cation is contacted with a source of a first oxide of a first tetravalent element or a source of a first oxide of a trivalent element; and a source of an oxide of a pentavalent elements.

The method involves preparing an as-synthesized molecular sieve with a Linde Type A (LTA) topology. The reaction mixture comprises a first structure directing agent comprising a triquaternary cation (I); and a source of a first oxide of a first tetravalent element.

The method can also comprise preparing a reaction mixture including a structure directing agent comprising a triquaternary cation (I), a source of a first oxide of a trivalent element; and a source of an oxide of a pentavalent element; and maintaining the reaction mixture for a time and under conditions to form crystals of the molecular sieve with LTA topology. The examples set forth above are provided to give those of ordinary skill in the art a complete disclosure and description of how to make and use the embodiments of the molecular sieves, structure agents, methods and systems of the disclosure, and are not intended to limit the scope of what the inventors regard as their disclosure. Modifications of the above-described modes for carrying out the disclosure that are obvious to persons of skill in the art are intended to be within the scope of the following claims.

All patents and publications mentioned in the specification are indicative of the levels of skill of those skilled in the art to which the disclosure pertains.

The entire disclosure of each document cited (including patents, patent applications, journal articles, abstracts, laboratory manuals, books, or other disclosures) in the Background, Summary, Detailed Description, and Examples is hereby incorporated herein by reference. All references cited in this disclosure are incorporated by reference to the same extent as if each reference had been incorporated by reference in its entirety individually. However, if any inconsistency arises between a cited reference and the present disclosure, the present disclosure takes precedence.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the disclosure claimed Thus, it should be understood that although the disclosure has been specifically disclosed by preferred embodiments, exemplary embodiments and optional features, modification and variation of the concepts herein disclosed can be resorted to by those skilled in the art, and that such modifications and variations are considered to be within the scope of this disclosure as defined by the appended claims.

When a Markush group or other grouping is used herein, all individual members of the group and all combinations and possible subcombinations of the group are intended to be individually included in the disclosure. Every combination of components or materials described or exemplified herein can be used to practice the disclosure, unless otherwise stated. One of ordinary skill in the art will appreciate that methods, device elements, and materials other than those specifically exemplified can be employed in the practice of the disclosure without resort to undue experimentation. All art-known functional equivalents, of any such methods, device elements, and materials are intended to be included in this disclosure. Whenever a range is given in the specification, for example, a temperature range, a frequency range, a time range, or a composition range, all intermediate ranges and all subranges, as well as, all individual values included in the ranges given are intended to be included in the disclosure. Any one or more individual members of a range or group disclosed herein can be excluded from a claim of this disclosure. The disclosure illustratively described herein suitably can be practiced in the absence of any element or elements, limitation or limitations which is not specifically disclosed herein.

A number of embodiments of the disclosure have been described. The specific embodiments provided herein are examples of useful embodiments of the disclosure and it will be apparent to one skilled in the art that the disclosure can be carried out using a large number of variations of the devices, device components, methods steps set forth in the present description. As will be obvious to one of skill in the art, methods and devices useful for the present methods can include a large number of optional composition and processing elements and steps.

It is to be understood that the disclosures are not limited to particular compositions or chemical systems, which can, of course, vary. It is also to be understood that the terminology used herein is for the purpose of describing particular embodiments only, and is not intended to be limiting. As used in this specification and the appended claims, the singular forms "a," "an" and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

Additionally, unless otherwise specified, the recitation of a genus of elements, materials or other components, from which an individual component or mixture of components can be selected, is intended to include all possible subgeneric combinations of the listed components and mixtures thereof. Also, "comprise," "include" and their variants, are intended to be non-limiting, such that recitation of items in a list is not to the exclusion of other like items that can also be useful in the materials, compositions and methods of this disclosure.

Although any methods and materials similar or equivalent to those described herein can be used in the practice for testing of the products, methods and system of the present disclosure, exemplary appropriate materials and methods are described herein as examples and for guidance purpose.

In particular, it will be understood that various modifications may be made without departing from the spirit and scope of the present disclosure. Accordingly, other embodiments are within the scope of the following claims.

The invention claimed is:

1. An as-synthesized molecular sieve with a Linde Type A (LTA) topology prepared by a method, the method comprising hydrothermally treating a reaction mixture comprising:
   a first structure directing agent comprising a triquaternary cation (I);

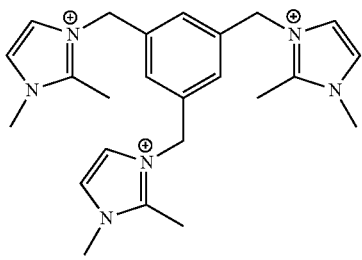

a source of a first oxide of a first tetravalent element,
a source of fluoride, and
optionally, a source of a second oxide of a second tetravalent element
for a time and under conditions to form crystals of the molecular sieve with LTA topology.

2. The as-synthesized molecular sieve of claim 1, wherein hydrothermally treating comprises heating the reaction mixture at a temperature in a range of from 100° C. to 200° C.

3. The as-synthesized molecular sieve of claim 1, wherein the first and second tetravalent elements are selected from a group consisting of silicon, germanium, titanium, tin, zirconium, and hafnium.

4. The as-synthesized molecular sieve of claim 1, wherein the reaction mixture further comprises a second structure directing agent capable of directing the formation of LTA molecular sieves.

5. The as-synthesized molecular sieve of claim 4, wherein the second structure directing agent is selected from a group consisting of tetramethylammonium, tetraethylammonium, diethanolamine, benzyl-3-methyl-1H-imidazol-3-ium, methylated julolidine (4-methyl-2,3,4,5,6,7-hexahydro-1H-pyrido[3,2,1-ij]quinolin-4-ium), 4,7,13,16,21,24-Hexaoxa-1,10-diazabicyclo[8.8.8]hexacosane, and 18-crown-6-ether.

6. The as-synthesized molecular sieve of claim 1, wherein hydrothermally treating comprises heating the reaction mixture at a temperature in a range of from 140° C. to 170° C.

7. The as-synthesized molecular sieve of claim 1, wherein the reaction mixture further comprises seed crystals having LTA topology.

8. An as-synthesized molecular sieve with a Linde Type A (LTA) topology prepared by a method, the method comprising:
hydrothermally treating a reaction mixture comprising:
a first structure directing agent comprising a triquaternary cation (1),

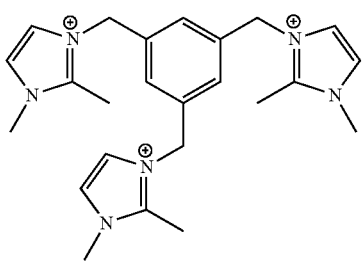

a source of a first oxide selected from a group consisting of oxides of trivalent elements;
a source of a second oxide selected from a group consisting of oxides of pentavalent elements; and
optionally a source of a third oxide selected from a group consisting of oxides of metals having a +2 oxidation state and oxides of tetravalent elements
for a time and under conditions to form crystals of the molecular sieve with LTA topology.

9. The as-synthesized molecular sieve of claim 8, wherein the trivalent elements are selected from a group consisting of gallium, aluminum, iron, boron, titanium, vanadium, chromium, indium, thallium, scandium, and yttrium, and wherein the pentavalent elements are selected from a group consisting of phosphorus, arsenic, antimony, and bismuth.

10. The as-synthesized molecular sieve of claim 9, wherein the metals having an oxidation state of +2 are selected from a group consisting of zinc, iron, cobalt, copper, iron, manganese, magnesium, and nickel, and wherein the tetravalent elements are selected from a group consisting of silicon, germanium, titanium, tin, hafnium, and zirconium.

11. The as-synthesized molecular sieve of claim 8, wherein the reaction mixture further comprises a source of fluoride, a second structure directing agent capable of directing the formation of LTA molecular sieves, or a combination thereof.

12. The as-synthesized molecular sieve of claim 11, wherein the second structure directing agent is selected from a group consisting of tetramethylammonium, tetraethylammonium, diethanolamine, 1-benzyl-3-methyl-1H-imidazol-3-ium, methylated julolidine (4-methyl-2,3,4,5,6,7-hexahydro-1H-pyrido[3,2,1-ij]quinolin-4-ium), 4,7,13,16,21,24-Hexaoxa-1,10-diazabicyclo[8.8.8]hexacosane, and 18-crown-6-ether.

13. The as-synthesized molecular sieve of claim 8, wherein the reaction mixture further comprises seed crystals having LTA topology.

14. The as-synthesized molecular sieve of claim 8, wherein the hydrothermally treating comprises heating the reaction mixture at a temperature in a range of from 100° C. to 200° C.

15. The as-synthesized molecular sieve of claim 8, wherein the maintaining comprises heating the reaction mixture at a temperature in a range of from 160° C. to 180° C.

16. A method for preparing an as-synthesized molecular sieve with a Linde Type A (LTA) topology the method comprising hydrothermally treating a reaction mixture comprising:
a first structure directing agent comprising a triquaternary cation (I);

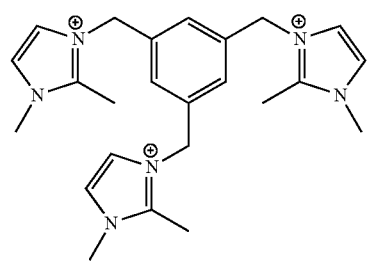

a source of a first oxide of a first tetravalent element,
a source of fluoride, and
optionally, a source of a second oxide of a second tetravalent element for a time and under conditions to form crystals of the molecular sieve with LTA topology.

17. The method of claim 16, wherein hydrothermally treating comprises heating the reaction mixture at a temperature in a range of from 100° C. to 200° C.

18. The method of claim 16, wherein the first tetravalent element and the second tetravalent element are independently selected from a group consisting of silicon, germanium, titanium, tin, zirconium, and hafnium.

19. The method of claim 16, wherein the reaction mixture further comprises a second structure directing agent capable of directing the formation of LTA molecular sieves.

20. The method of claim 19, wherein the second structure directing agent is selected from a group consisting of tetramethylammonium, tetraethylammonium, diethanolamine, 1-benzyl-3-methyl-1H-imidazol-3-ium, methylated julolidine (4-methyl-2,3,4,5,6,7-hexahydro-1H-pyrido[3,2,1-ij]quinolin-4-ium), 4,7,13,16,21,24-Hexaoxa-1,10-diazabicyclo[8.8.8]hexacosane, and 18-crown-6-ether.

21. The method of claim 16, wherein the reaction mixture further comprises seed crystals having LTA topology.

22. The method of claim 16, the hydrothermally treating comprises heating the reaction mixture at a temperature in a range of from 140° C. to 170° C.

23. A method for preparing an as-synthesized molecular sieve with a Linde Type A (LTA) topology, the method comprising hydrothermally treating a reaction mixture comprising:
a first structure directing agent comprising a triquaternary cation (1),

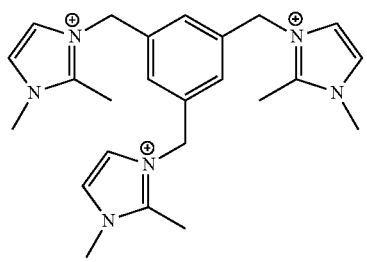

(I)

a source of a first oxide selected from a group consisting of oxides of trivalent elements;
a source of a second oxide selected from a group consisting of oxides of pentavalent elements, and
optionally a source of a third oxide selected from a group consisting of oxides of metals having a +2 oxidation state and oxides of tetravalent elements
for a time and under conditions to form crystals of the molecular sieve with LTA topology.

24. The method of claim 23, wherein the trivalent elements are selected from a group consisting of gallium, aluminum, iron, boron, titanium, vanadium, chromium, indium, thallium, scandium, and yttrium, and wherein the pentavalent elements are selected from a group consisting of phosphorus, arsenic, antimony, and bismuth.

25. The method of claim 23, wherein the metals having an oxidation state of +2 are selected from a group consisting of zinc, iron, cobalt, copper, iron, manganese, magnesium, and nickel, and wherein the tetravalent elements are selected from a group consisting of silicon, germanium, titanium, tin, hafnium, and zirconium.

26. The method of claim 23, wherein the reaction mixture further comprises a source of fluoride, a second structure directing agent capable of directing the formation of LTA molecular sieves, or a combination thereof.

27. The method of claim 26, wherein the second structure directing agent is selected from a group consisting of tetramethylammonium, tetraethylammonium, diethanolamine, 1-benzyl-3-methyl-1H-imidazol-3-ium, methylated julolidine (4-methyl-2,3,4,5,6,7-hexahydro-1H-pyrido[3,2,1-ij]quinolin-4-ium), 4,7,13,16,21,24-Hexaoxa-1,10-diazabicyclo[8.8.8]hexacosane, and 18-crown-6-ether.

28. The method of claim 23, wherein the reaction mixture further comprises seed crystals having LTA topology.

29. The method of claim 23, wherein hydrothermally treating comprises heating the reaction mixture at a temperature in a range of from 100° C. to 200° C.

30. The method of claim 23, wherein hydrothermally treating comprises heating the reaction mixture at a temperature in a range of from 160° C. to 180° C.

31. A molecular sieve of Linde Type A (LTA) topology having pores containing a first structure directing agent comprising a triquaternary cation (1),

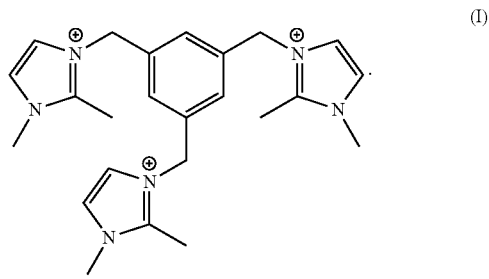 [SMILES: Cc1n(C)cc[n+]1Cc1cc(C[n+]2ccn(C)c2C)cc(C[n+]2ccn(C)c2C)c1]

(I)

32. The molecular sieve of claim 31 having a framework comprising an oxide of at least one oxide of a tetravalent element.

33. The molecular sieve of claim 32, wherein the tetravalent element is silicon, germanium, titanium, tin, hafnium, zirconium, or a combination thereof.

34. The molecular sieve of claim 32, wherein the oxide of at least one oxide of a tetravalent element comprises an oxide of silicon.

35. The molecular sieve of claim 31 having a framework comprising at least one oxide of a trivalent element and at least one oxide of a pentavalent element.

36. The molecular sieve of claim 35, wherein the at least one oxide of a trivalent element is an oxide of gallium, aluminum, iron, boron, titanium, vanadium, chromium, indium, thallium, scandium, yttrium, or combination thereof.

37. The molecular sieve of claim 35, wherein the at least one oxide of a pentavalent element is an oxide of phosphorus, arsenic, antimony, bismuth, or combination thereof.

38. The molecular sieve of claim 35, wherein the framework further comprises at least one oxide of a metal having an oxidation state of +2, at least one oxide of a tetravalent element, or a combination thereof.

39. The molecular sieve of claim 38, wherein the framework comprises at least one oxide of a metal having an oxidation state of +2, wherein the at least one oxide of a metal having an oxidation state of +2 is an oxide of zinc, iron, cobalt, copper, iron, manganese, magnesium, nickel, or a combination thereof.

40. The molecular sieve of claim 38, wherein the framework comprises at least one oxide of a tetravalent element that is an oxide of silicon, germanium, titanium, tin, hafnium, and zirconium, or combination thereof.

41. The molecular sieve of claim 35, wherein the molecular sieve is an aluminophosphate molecular sieve.

* * * * *